United States Patent
Huang et al.

(10) Patent No.: US 12,047,939 B2
(45) Date of Patent: Jul. 23, 2024

(54) SEQUENCE PARTITIONING FOR A MULTI-USER UPLINK CHANNEL

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/332,922

(22) Filed: May 27, 2021

(65) Prior Publication Data

US 2021/0377974 A1    Dec. 2, 2021

Related U.S. Application Data

(60) Provisional application No. 63/033,169, filed on Jun. 1, 2020.

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0071* (2013.01); *H04L 27/2607* (2013.01); *H04W 72/02* (2013.01); *H04W 72/0466* (2013.01)

(58) Field of Classification Search
None
See application file for complete search history.

(56) References Cited

U.S. PATENT DOCUMENTS 9,865,353 B1 * 1/2018 Yassine ................. G11C 16/10
2011/0019529 A1 * 1/2011 Wang ................... H04L 1/1692
370/252

(Continued)

OTHER PUBLICATIONS

InterDigitalInc.:"OnHARQ-ACKandSRmultiplexingonShort-PUCCH";3GPPTSGRANWGIMeeting91;A1-1720638 (Year: 2017).*

(Continued)

*Primary Examiner* — Jeffrey M Rutkowski
*Assistant Examiner* — Mehedi S Aley
(74) *Attorney, Agent, or Firm* — QUALCOMM Incorporated

(57) ABSTRACT

Methods, systems, and devices for wireless communications are described. In some systems, a user equipment (UE) or a base station, or both, may determine a configuration for partitioning a set of sequences into multiple sequence pools associated with multiple UEs. The UE or the base station, or both, may determine a sequence pool associated with the UE based on the configuration, which may include parameters or instructions for determining the sequence pool associated with the UE. The UE or the base station, or both, may select a subset of sequences from the sequence pool associated with the UE and construct a codebook including the subset of sequences. The UE may select a sequence from the constructed codebook based on a quantity of bits of a payload and may transmit the payload to the base station using the selected sequence.

27 Claims, 21 Drawing Sheets

(51) Int. Cl.
*H04L 27/26* (2006.01)
*H04W 72/02* (2009.01)
*H04W 72/044* (2023.01)

(56) References Cited

U.S. PATENT DOCUMENTS

| | | | |
|---|---|---|---|
| 2011/0141928 A1* | 6/2011 | Shin | H04L 1/0028 370/252 |
| 2012/0113910 A1* | 5/2012 | Jen | H04L 5/0096 370/329 |
| 2018/0242286 A1* | 8/2018 | Song | H04L 1/0072 |
| 2018/0279266 A1* | 9/2018 | Li | H04L 1/1825 |
| 2019/0082351 A1* | 3/2019 | Nammi | H04L 1/1858 |
| 2019/0149298 A1* | 5/2019 | Yang | H04B 7/0456 370/336 |
| 2019/0165879 A1* | 5/2019 | Wang | H04L 1/001 |
| 2020/0228289 A1* | 7/2020 | He | H04L 5/001 |
| 2021/0092734 A1 | 3/2021 | Yang et al. | |
| 2021/0185657 A1* | 6/2021 | Zhang | H04L 5/0037 |

OTHER PUBLICATIONS

InterDigital Inc: "On HARQ-ACK and SR Multiplexing on Short-PUCCH", 3GPP Draft, 3GPP TSG RAN WG1 Meeting 91, R1-1720638, On HARQ-ACK and SR Multiplexing on Short-PUCCH, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051370102, Retrieved from the Internet: URL:http://www.3gpp.org/ftp/tsg%5Fran/WG1%5FRL1/TSGR1%5F91/Docs/ [retrieved on Nov. 18, 2017], 8 pages.

International Search Report and Written Opinion—PCT/US2021/034839—ISA/EPO—Aug. 31, 2021.

Qualcomm Incorporated: "Channelization of 1-Symbol Short PUCCH with 1 or 2 Bits Payload", 3GPP Draft, 3GPP TSG RAN WG1 Meeting #90b, R1-1718559, Channelization of 1-Symbol Short PUCCH with 1 or 2 Bits Payload, 3rd Generation Partnership Project (3GPP), Mobile Competence Centre, 650, Route Des Lucioles, F-06921 Sophia-A, vol. RAN WG1, No. Prague, CZ, Oct. 9, 2017-Oct. 13, 20171013, Oct. 8, 2017 (Oct. 8, 2017), XP051341740, 19 Pages, Retrieved from the Internet: URL: http://www.3gpp.org/ftp/Meetings_3GPP_SYNC/RAN1/Docs/. [Retrieved on Oct. 8, 2017] Section 3, p. 6-p. 12, figures 3-6 table 5 Set ion 5. 1. 2, p. 16.

Qualcomm Incorporated: "Potential Coverage Enhancement Techniques for PUCCH", 3GPP Draft, R1-2009802, 3GPP TSG-RAN WG1 Meeting #103e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 17, 2020, (Nov. 17, 2020), XP051955627, 27 pages, Retrieved from the Internet: URL: https://ftp.3gpp.org/tsg_ran/WG1_RL1/TSGR1_103-e/Docs/R1-2009802.zip, R1-2009802/R1-2009802 Potential Coverage Enhancement Techniques for PUCCH.docx [retrieved on Nov. 17, 2020] Paragraph [3. Enhancing Beam switching Reliability], Sections 2.1, 2.2 and 2.3.

Qualcomm Incorporated: "Potential Techniques for Coverage Enhancements", 3GPP TSG-RAN WG1 Meeting #101, 3GPP Draft, R1-2004499, 3rd Generation Partnership Project (3GPP), Mobile Competence Centre, 650, Route Des Lucioles, F-06921 Sophia-Antipolis Cedex, France, vol. RAN WG1. No. e-Meeting; May 25, 2020-Jun. 5, 2020, May 16, 2020 (May 16, 2020), 15 Pages, XP051886228, Retrieved from the Internet: URL: https://www.3gpp.org/ftp/TSG_RAN/WG1_RL1/TSGR1_101-e/Docs/R1-2004499.zip, R1-2004499, Potential techniques for coverage enhancement.docx [retrieved on May 16, 2020], paragraph [06.2].

* cited by examiner

Column $n$ $$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix}$$

Row $n$ →

— 500

$$S(m) = \begin{bmatrix} S(M-1)\, e^{j2\pi(M-1)m/M} \\ \vdots \\ S(l)\, e^{j2\pi lm/M} \\ \vdots \\ S(2)\, e^{j2\pi 2m/M} \\ S(1)\, e^{j2\pi 1m/M} \\ S(0)\, e^{j2\pi 0m/M} \end{bmatrix}$$

Tone Index

← Tone Index $l$

SEQUENCE PARTITIONING FOR A MULTI-USER UPLINK CHANNEL

CROSS REFERENCE

The present application for patent claims the benefit of U.S. Provisional Patent Application No. 63/033,169 by HUANG et al., entitled "SEQUENCE PARTITIONING FOR A MULTI-USER UPLINK CHANNEL," filed Jun. 1, 2020, assigned to the assignee hereof, and expressly incorporated by reference herein.

FIELD OF TECHNOLOGY

The following relates generally to wireless communications and more specifically to sequence partitioning for a multi-user uplink channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may transmit a payload to a base station using a sequence selected from a group of sequences.

SUMMARY

The described techniques relate to improved methods, systems, devices, and apparatuses that support sequence partitioning for a multi-user uplink channel. Generally, the described techniques provide for a multi-user design for sequence-based transmissions using an uplink control channel, although the techniques may also be applied to a sidelink control channel. For example, a user equipment (UE) or a base station, or both, may determine a partitioning of a set of sequences into a set of sequence pools, each sequence pool of the set of sequence pools usable by a different UE to transmit a payload over the uplink control channel. The set of sequence pools may be continuous (e.g., non-interleaved) or may be interleaved within the larger set of sequences. The UE or the base station, or both, may determine a first sequence pool usable by the UE based on generating the first sequence pool or based on selecting the sequences of the first sequence pool from the larger set of sequences.

In some implementations, for example, the set of sequences may refer to a set of non-orthogonal sequences and the UE or the base station, or both, may generate the first sequence pool based on one or more parameters and, in some cases, a random number (or a random sequence generator). For example, the UE or the base station, or both, may generate the first sequence pool based on inputting an initial seed into a random number generator to generate the first sequence pool. In such examples, the UE or the base station, or both, may determine the initial seed based on a UE identifier (ID), a slot ID, a frame ID, or any combination thereof.

In some other implementations, the set of sequences may refer to a set of orthogonal sequences and the UE or the base station, or both, may generate the first sequence pool based on determining a product of select rows or columns of an orthogonal matrix and select cyclical shift indices of a base sequence (e.g., select cyclical shift indices of a cell-specific base sequence). The orthogonal matrix may have a size (e.g., a quantity of rows and a quantity of columns) corresponding to a quantity of time periods, such as symbol periods, of a resource allocation over which the UE may transmit the payload, and the cyclically shifted base sequence may have a size (e.g., a length) corresponding to a quantity of frequency tones, or subcarriers, of the resource allocation. In some examples, the first sequence pool of orthogonal sequences may be generated by determining a product (e.g., a Kronecker product) of each selected row or column of the orthogonal matrix and each selected cyclical shift index of the base sequence.

In some further implementations, the UE or the base station, or both, may generate the set of sequences based on determining a product of the orthogonal matrix (e.g., the entire orthogonal matrix) and a cyclically shifted base sequence (e.g., all cyclical shift indices of a base sequence) and may determine the first sequence pool from the set of sequences based on determining which sequences of the set of sequences correspond to (e.g., are the product of) select rows or columns of the orthogonal matrix and select cyclical shift indices of the base sequence. Alternatively, the UE or the base station, or both, may determine the first sequence pool from the set of sequences based on identifying a continuous block of sequences addressed to the first sequence pool (e.g., based on the configuration) or based on an interleaving granularity associated with the set of sequences.

Upon determining the first sequence pool, the UE or the base station, or both, may select a subset of sequences from the first sequence pool based on a quantity of bits of a payload for transmission from the UE. For example, the UE or the base station, or both, may select a quantity of sequences such that each bit value of the payload (e.g., each permutation of the quantity of bits in the payload) may correspond to a different sequence in the subset of sequences. The UE or the base station, or both, may construct a codebook and include the selected subset of sequences in the constructed codebook. In some examples, the UE may select a sequence from the constructed codebook based on a decimal number conversion corresponding to a bit stream of the payload. For example, the UE may convert the bit stream into the decimal number and may map the decimal number to an index in the constructed codebook and, as such, the UE may select a sequence from the codebook corresponding to the determined index. Accordingly, the UE may transmit, to the base station, the payload using the selected sequence.

A method of wireless communications at a UE is described. The method may include receiving a configuration for partitioning a set of sequences into a set of sequence pools associated with a set of UEs, determining a subset of sequences from a first sequence pool of the set of sequence pools for conveying a payload based on the configuration, where a size of the subset of sequences is based on a quantity of a set of bits of the payload, selecting a sequence from the subset of sequences based on a mapping between the subset of sequences and the set of bits, and transmitting the payload including the set of bits using the selected sequence.

An apparatus for wireless communications at a UE is described. The apparatus may include a processor, memory coupled with the processor, and instructions stored in the memory. The instructions may be operable, when executable by the processor, to cause the apparatus to receive a configuration for partitioning a set of sequences into a set of sequence pools associated with a set of UEs, determine a subset of sequences from a first sequence pool of the set of sequence pools for conveying a payload based on the configuration, where a size of the subset of sequences is based on a quantity of a set of bits of the payload, select a sequence from the subset of sequences based on a mapping between the subset of sequences and the set of bits, and transmit the payload including the set of bits using the selected sequence.

Another apparatus for wireless communications at a UE is described. The apparatus may include means for receiving a configuration for partitioning a set of sequences into a set of sequence pools associated with a set of UEs, determining a subset of sequences from a first sequence pool of the set of sequence pools for conveying a payload based on the configuration, where a size of the subset of sequences is based on a quantity of a set of bits of the payload, selecting a sequence from the subset of sequences based on a mapping between the subset of sequences and the set of bits, and transmitting the payload including the set of bits using the selected sequence.

A non-transitory computer-readable medium storing code for wireless communications at a UE is described. The code may include instructions executable by a processor to receive a configuration for partitioning a set of sequences into a set of sequence pools associated with a set of UEs, determine a subset of sequences from a first sequence pool of the set of sequence pools for conveying a payload based on the configuration, where a size of the subset of sequences is based on a quantity of a set of bits of the payload, select a sequence from the subset of sequences based on a mapping between the subset of sequences and the set of bits, and transmit the payload including the set of bits using the selected sequence.

Some examples of the method, apparatuses, and non-transitory computer-readable medium described herein may further include operations, features, means, or instructions for determining the first sequence pool based on the configuration, where the first sequence pool may be associated with the UE.

In some examples of the method, apparatuses, and non-transitory computer-readable medium described herein, determining the first sequence pool may include operations, features, means, or instructions for determining a pool of continuous sequences of the set of sequences.

Some examples of the method, apparatuses, and non-transitory computer-readable medium described herein may further include operations, features, means, or instructions for receiving an interleaving value, where the determining of the first sequence pool may be based on the interleaving value.

In some examples of the method, apparatuses, and non-transitory computer-readable medium described herein, determining the first sequence pool may include operations, features, means, or instructions for determining a first quantity of sequences corresponding to the interleaving value, and determining a second quantity of sequences corresponding to the interleaving value a distance from the first quantity of sequences based on a quantity of the set of UEs and the interleaving value.

Some examples of the method, apparatuses, and non-transitory computer-readable medium described herein may further include operations, features, means, or instructions for determining an initial seed based on a UE ID, a slot ID, a frame ID, or any combination thereof, and generating the first sequence pool based on the initial seed.

Some examples of the method, apparatuses, and non-transitory computer-readable medium described herein may further include operations, features, means, or instructions for receiving an indication of the UE ID.

In some examples of the method, apparatuses, and non-transitory computer-readable medium described herein, the first sequence pool may be generated based on a pseudo-random random number generator.

In some examples of the method, apparatuses, and non-transitory computer-readable medium described herein, the first sequence pool may be generated based on a maximum length sequence.

In some examples of the method, apparatuses, and non-transitory computer-readable medium described herein, the first sequence pool may be generated based on a Gold sequence.

Some examples of the method, apparatuses, and non-transitory computer-readable medium described herein may further include operations, features, means, or instructions for identifying, based on the configuration, a first subset of indices of an orthogonal matrix and a second subset of indices of a cyclically shifted cell-specific sequence, and generating the first sequence pool based on a product of the first subset of indices of the orthogonal matrix and the second subset of indices of the cyclically shifted cell-specific sequence.

In some examples of the method, apparatuses, and non-transitory computer-readable medium described herein, the first subset of indices of the orthogonal matrix and the second subset of indices of the cyclically shifted cell-specific sequence include continuous indices, interleaved indices, or any combination thereof.

In some examples of the method, apparatuses, and non-transitory computer-readable medium described herein, the orthogonal matrix may be a discrete Fourier transform (DFT) matrix.

Some examples of the method, apparatuses, and non-transitory computer-readable medium described herein may further include operations, features, means, or instructions for generating the set of sequences based on a product of an orthogonal matrix having a size corresponding to a quantity of time periods and a cyclically shifted cell-specific sequence having a length corresponding to a quantity of frequency tones, where the quantity of time periods and the quantity of frequency tones include a resource allocation for conveying the payload, identifying, based on the configuration, a first subset of indices of the orthogonal matrix and a second subset of indices of the cyclically shifted cell-specific sequence, and determining the first sequence pool from the set of sequences based on the first subset of indices of the orthogonal matrix and the second subset of indices of the cyclically shifted cell-specific sequence.

In some examples of the method, apparatuses, and non-transitory computer-readable medium described herein, the first subset of indices of the orthogonal matrix and the second subset of indices of the cyclically shifted cell-specific sequence include continuous indices, interleaved indices, or any combination thereof.

In some examples of the method, apparatuses, and non-transitory computer-readable medium described herein, the orthogonal matrix may be a DFT matrix.

Some examples of the method, apparatuses, and non-transitory computer-readable medium described herein may further include operations, features, means, or instructions for converting the set of bits into a decimal number, where the mapping between the subset of sequences and the set of bits may be based on a mapping between the decimal number and an index of the subset of sequences.

In some examples of the method, apparatuses, and non-transitory computer-readable medium described herein, the subset of sequences includes a codebook for conveying the payload including the set of bits.

In some examples of the method, apparatuses, and non-transitory computer-readable medium described herein, each sequence of the set of sequences may be a sequence of numbers.

A method of wireless communications at a base station is described. The method may include determining a configuration for partitioning a set of sequences into a set of sequence pools associated with a set of UEs, transmitting the configuration for partitioning the set of sequences, determining a subset of sequences from a first sequence pool of the set of sequence pools for conveying a payload based on the configuration, where a size of the subset of sequences is based on a quantity of a set of bits of the payload, and receiving the payload including the set of bits using a selected sequence from the subset of sequences, the selected sequence based on a mapping between the subset of sequences and the set of bits.

An apparatus for wireless communications at a base station is described. The apparatus may include a processor, memory coupled with the processor, and instructions stored in the memory. The instructions may be operable, when executed by the processor, to cause the apparatus to determine a configuration for partitioning a set of sequences into a set of sequence pools associated with a set of UEs, transmit the configuration for partitioning the set of sequences, determine a subset of sequences from a first sequence pool of the set of sequence pools for conveying a payload based on the configuration, where a size of the subset of sequences is based on a quantity of a set of bits of the payload, and receive the payload including the set of bits using a selected sequence from the subset of sequences, the selected sequence based on a mapping between the subset of sequences and the set of bits.

Another apparatus for wireless communications at a base station is described. The apparatus may include means for determining a configuration for partitioning a set of sequences into a set of sequence pools associated with a set of UEs, transmitting the configuration for partitioning the set of sequences, determining a subset of sequences from a first sequence pool of the set of sequence pools for conveying a payload based on the configuration, where a size of the subset of sequences is based on a quantity of a set of bits of the payload, and receiving the payload including the set of bits using a selected sequence from the subset of sequences, the selected sequence based on a mapping between the subset of sequences and the set of bits.

A non-transitory computer-readable medium storing code for wireless communications at a base station is described. The code may include instructions executable by a processor to determine a configuration for partitioning a set of sequences into a set of sequence pools associated with a set of UEs, transmit the configuration for partitioning the set of sequences, determine a subset of sequences from a first sequence pool of the set of sequence pools for conveying a payload based on the configuration, where a size of the subset of sequences is based on a quantity of a set of bits of the payload, and receive the payload including the set of bits using a selected sequence from the subset of sequences, the selected sequence based on a mapping between the subset of sequences and the set of bits.

Some examples of the method, apparatuses, and non-transitory computer-readable medium described herein may further include operations, features, means, or instructions for determining a second subset of sequences from a second sequence pool of the set of sequence pools for conveying a second payload based on the configuration, where a size of the second subset of sequences may be based on a second quantity of a second set of bits of the second payload, and receiving the second payload including the second set of bits using a second selected sequence from the second subset of sequences, the second selected sequence based on a second mapping between the second subset of sequences and the second set of bits.

Some examples of the method, apparatuses, and non-transitory computer-readable medium described herein may further include operations, features, means, or instructions for determining the first sequence pool based on the configuration, where the first sequence pool may be associated with a first UE.

In some examples of the method, apparatuses, and non-transitory computer-readable medium described herein, determining the first sequence pool may include operations, features, means, or instructions for determining a pool of continuous sequences of the set of sequences.

Some examples of the method, apparatuses, and non-transitory computer-readable medium described herein may further include operations, features, means, or instructions for determining an interleaving value, where the determining of the first sequence pool may be based on the interleaving value, and transmitting the interleaving value.

In some examples of the method, apparatuses, and non-transitory computer-readable medium described herein, determining the first sequence pool may include operations, features, means, or instructions for determining a first quantity of sequences corresponding to the interleaving value, and determining a second quantity of sequences corresponding to the interleaving value a distance from the first quantity of sequences based on a quantity of the set of UEs and the interleaving value.

Some examples of the method, apparatuses, and non-transitory computer-readable medium described herein may further include operations, features, means, or instructions for determining an initial seed based on a UE ID, a slot ID, a frame ID, or any combination thereof, and generating the first sequence pool based on the initial seed.

Some examples of the method, apparatuses, and non-transitory computer-readable medium described herein may further include operations, features, means, or instructions for transmitting an indication of the UE ID.

In some examples of the method, apparatuses, and non-transitory computer-readable medium described herein, the first sequence pool may be generated based on a pseudo-random number generator.

In some examples of the method, apparatuses, and non-transitory computer-readable medium described herein, the first sequence pool may be generated based on a maximum length sequence.

In some examples of the method, apparatuses, and non-transitory computer-readable medium described herein, the first sequence pool may be generated based on a Gold sequence.

Some examples of the method, apparatuses, and non-transitory computer-readable medium described herein may further include operations, features, means, or instructions for identifying, based on the configuration, a first subset of indices of an orthogonal matrix and a second subset of indices of a cyclically shifted cell-specific sequence, and generating the first sequence pool based on a product of the first subset of indices of the orthogonal matrix and the second subset of indices of the cyclically shifted cell-specific sequence.

In some examples of the method, apparatuses, and non-transitory computer-readable medium described herein, the first subset of indices of the orthogonal matrix and the second subset of indices of the cyclically shifted cell-specific sequence include continuous indices, interleaved indices, or any combination thereof.

In some examples of the method, apparatuses, and non-transitory computer-readable medium described herein, the orthogonal matrix may be a DFT matrix.

Some examples of the method, apparatuses, and non-transitory computer-readable medium described herein may further include operations, features, means, or instructions for generating the set of sequences based on a product of an orthogonal matrix having a size corresponding to a quantity of time periods and a cyclically shifted cell-specific sequence having a length corresponding to a quantity of frequency tones, where the quantity of time periods and the quantity of frequency tones include a resource allocation for conveying the payload, identifying, based on the configuration, a first subset of indices of the orthogonal matrix and a second subset of indices of the cyclically shifted cell-specific sequence, and determining the first sequence pool from the set of sequences based on the first subset of indices of the orthogonal matrix and the second subset of indices of the cyclically shifted cell-specific sequence.

In some examples of the method, apparatuses, and non-transitory computer-readable medium described herein, the first subset of indices of the orthogonal matrix and the second subset of indices of the cyclically shifted cell-specific sequence include continuous indices, interleaved indices, or any combination thereof.

In some examples of the method, apparatuses, and non-transitory computer-readable medium described herein, the orthogonal matrix may be a DFT matrix.

In some examples of the method, apparatuses, and non-transitory computer-readable medium described herein, the subset of sequences includes a codebook for conveying the payload including the set of bits.

In some examples of the method, apparatuses, and non-transitory computer-readable medium described herein, each sequence of the set of sequences may be a sequence of numbers.

BRIEF DESCRIPTION OF THE DRAWINGS

FIG. 5A illustrates an example of an orthogonal matrix and a base sequence that support sequence partitioning for a multi-user uplink channel in accordance with aspects of the present disclosure.

DETAILED DESCRIPTION

Figure 1:
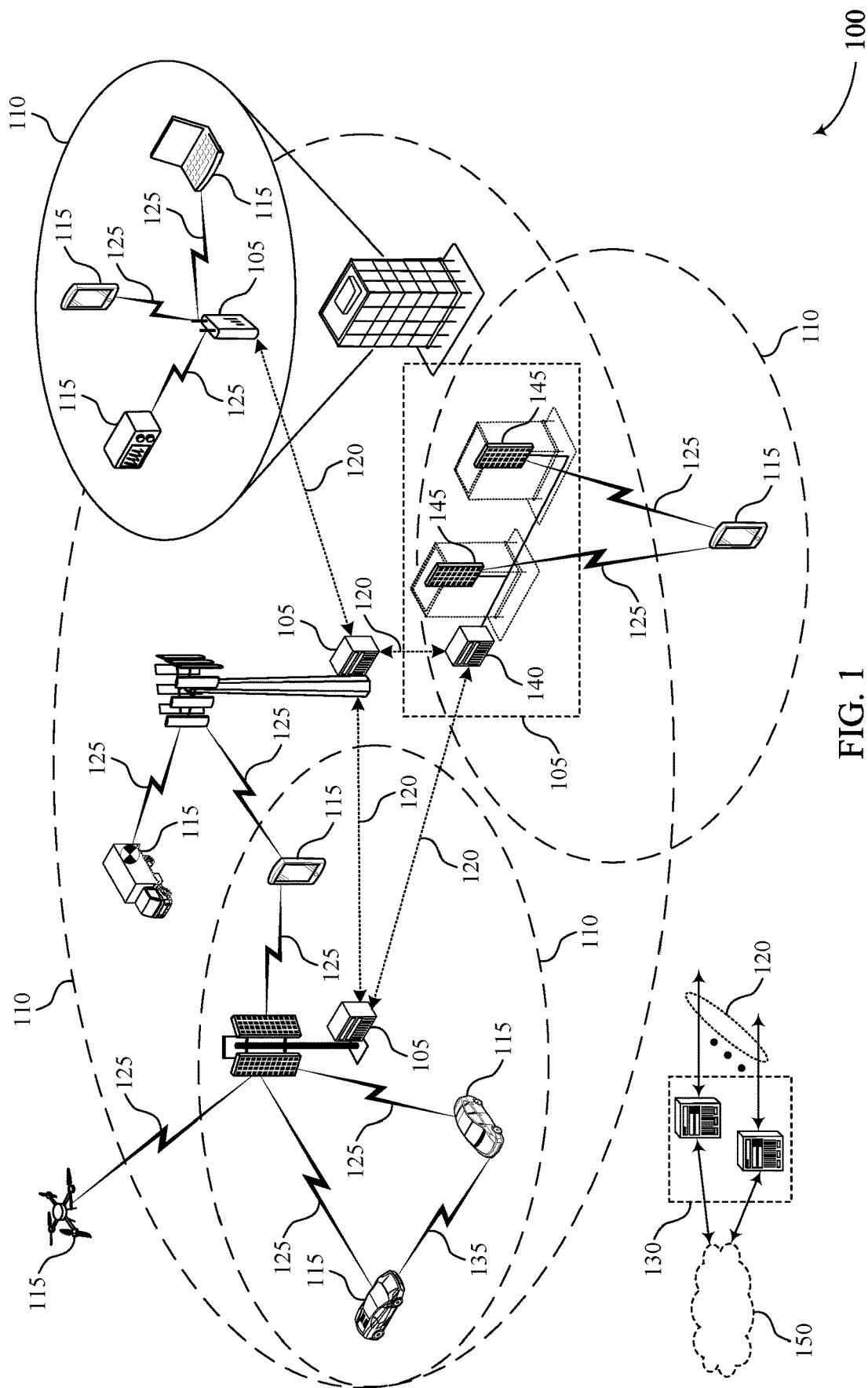
FIG. 1 illustrates an example of a wireless communications system that supports sequence partitioning for a multi-user uplink channel in accordance with aspects of the present disclosure.

Wireless communications systems may support communications between a user equipment (UE) and a base station and the UE and the base station may communicate over a channel allocated for communication between the UE and the base station. In some cases, the UE and the base station may transmit signals comprising a payload, such as a quantity of bits of information, to each other over the allocated resources in the channel. The UE may transmit, to the base station, a payload of a signal according to a selected sequence (or codepoint) associated with the allocated resources. The UE may select the sequence from a set of sequences associated with the allocated resources. In some cases, however, such sequence selection from the set of sequences associated with the allocated resources may exclude the opportunity for multiple UEs to communicate with the base station using the same allocated resources. For example, if the UE may select any sequence from the set of sequences associated with the allocated resource, other UEs may be unable to select a sequence from the set of sequences without the possibility of selecting the same sequence selected by the UE or selecting a sequence that may interfere with the sequence selected by the UE.

In some examples, the UE or the base station, or both, may determine a configuration for partitioning the set of sequences into a quantity of sequence pools that may each be used by a different UE. For example, a first UE may use a first sequence pool and a second UE may use a second sequence pool. In some implementations, the set of sequences may refer to a set of non-orthogonal sequences and the UE or the base station, or both, may generate a sequence pool based on one or more parameters associated with the UE. For example, the UE or the base station, or both, may generate the sequence pool based on an initial seed and, in some cases, a random number or a random sequence generator. In some other implementations, the set of sequences may refer to a set of orthogonal sequences and the UE or the base station, or both, may identify a subset of indices of an orthogonal matrix (e.g., a subset of rows or columns of the orthogonal matrix) and a subset of indices of a cell-specific base sequence (e.g., a subset of cyclic shifts of the cell-specific base sequence) and generate the sequence pool based on a product (e.g., a Kronecker product) of the first subset of indices of the orthogonal matrix and the second subset of indices of the cell-specific base sequence. In some further implementations, the UE or the base station, or both, may generate the set of sequences based on a product (e.g., a Kronecker product) of the orthogonal matrix (e.g., all rows or columns of the orthogonal matrix) and the cell-specific base sequence (e.g., all cyclic shifts of the cell-specific base sequence) and determine the sequence pool based on identifying sequences of the set of sequences corresponding to (e.g., that are a product of) the first subset of indices of the orthogonal matrix and the second subset of indices of the cell-specific base sequence.

The UE or the base station, or both, may determine a subset of sequences from the sequence pool and the UE may store the subset of sequences in a constructed codebook. In some implementations, a quantity of the subset of sequences may be based on a quantity of bits included in the payload, and each sequence of the subset of sequences may be associated with an index in the constructed codebook. In some examples, the UE may select a sequence from the constructed codebook based on the bits of the payload. For example, the UE may determine a bit stream of the payload and may convert the bit stream into a decimal number. The decimal number may correspond to an index in the constructed codebook and, as such, the UE may select the sequence from the constructed codebook that is associated with the index corresponding to the decimal number. Accordingly, the UE may transmit, to the base station the payload including the plurality of bits using the selected sequence.

Particular aspects of the subject matter described herein may be implemented to realize one or more potential advantages. The described techniques may enable multiple UEs to transmit a payload to a base station over a same resource allocation based on conveying their payloads by selecting a sequence from different sequence pools, which may result in higher data rates and greater achievable throughput in the system including the base station and the multiple UEs. Additionally, based on enabling multiple UEs to transmit a payload to the base station over the same resource allocation, the multiple UEs may achieve lower latency. Further, a UE, based on implementing the techniques related to efficiently constructing the codebook, may avoid storing more sequences than necessary to convey the payload. Moreover, in implementations of the present disclosure in which the set of sequences are orthogonal sequences, the use of orthogonal sequences may provide for more reliable communication between the UE and the base station, which may increase the likelihood for successful communications between the UE and the base station.

Aspects of the disclosure are initially described in the context of wireless communications systems. Aspects of the disclosure are additionally described in the context of example sequence partitions, an orthogonal matrix, a base sequence, and a mathematical operation involving the orthogonal matrix and the base sequence. Aspects of the disclosure are further illustrated by and described with reference to apparatus diagrams, system diagrams, and flowcharts that relate to sequence partitioning for a multi-user uplink channel.

FIG. 1 illustrates an example of a wireless communications system 100 that supports sequence partitioning for a multi-user uplink channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit a signal including a payload (e.g., a multi-bit payload) to a base station 105 over a resource allocation using a sequence (or a codepoint) selected from a set of sequences. In some cases, the resource allocation may be an uplink control channel, such as a physical uplink control channel (PUCCH). Each sequence of the set of sequences may have a length corresponding to the quantity of resource elements of the resource allocation. For example, the UE 115 may use a resource allocation of N OFDM symbols and M frequency tones (e.g., subcarriers) and, accordingly, each sequence of the set of sequences may have a length equal to N*M. The quantity of the set of sequences may be based on the type of the set of sequences. For example, in examples in which the set of sequences includes non-orthogonal sequences, the set of sequences may be any arbitrary quantity. Alternatively, in examples in which the set of sequences includes orthogonal sequences, the quantity of the set of sequences may be based on the quantity of N OFDM symbols and the quantity of M frequency tones of the resource allocation. For instance, in such examples in which the set of sequences includes orthogonal sequences, the quantity of the set of sequences may be equal to N*M.

In some implementations of the present disclosure, the UE 115 may transmit the signal including the payload to the base station 105 using a sequence selected from a sequence pool associated with the UE 115, where the sequence pool associated with the UE 115 includes a subset of the set of sequences. In some examples, the UE 115 may generate or otherwise determine the sequence pool associated with the UE 115 based on receiving a configuration for partitioning the set of sequences from the base station 105. In some aspects, the sequence pool may include continuous (e.g., non-interleaved) sequences from the set of sequences. In some other aspects, the sequence pool may include sequences (e.g., individual sequences or blocks of sequences) that are interleaved with other sequences or other sequence pools in the set of sequences.

The UE 115 may determine or otherwise select a subset of sequences from the sequence pool associated with the UE 115 for conveying the payload. In some examples, the size of the subset of sequences may be based on the size of the payload (e.g., a quantity of bits of the payload). For example, the UE 115 may identify that the payload includes a quantity of bits and may select a quantity of sequences from the sequence pool associated with the UE 115 based on the quantity of bits. In some aspects, the UE 115 may construct a codebook including the subset of sequences from the sequence pool associated with the UE 115. The UE 115 may select a sequence from the subset of sequences based on a bit stream of the payload. For example, the UE 115 may determine that the payload is associated with a bit stream (e.g., successive values of a quantity of bits) and may determine a value corresponding to the bit stream based on a mapping. The UE 115 may use the value to select a sequence from the subset of sequences based on indices of the subset of sequences in the constructed codebook. For instance, the UE 115 may select a sequence from the constructed codebook based on identifying an index associated with each of the sequences in the codebook and mapping (i.e., matching) the value determined based on the bit stream to an index in the codebook. As such, the UE 115 may select the sequence associated with the index value that maps to the bit stream of the payload and may transmit the payload including the quantity of bits using the selected sequence. Although described in the context of the UE 115, the base station 105 may perform similar or complementary operations and may receive the payload including the quantity of bits using the selected sequence.

Figure 2:
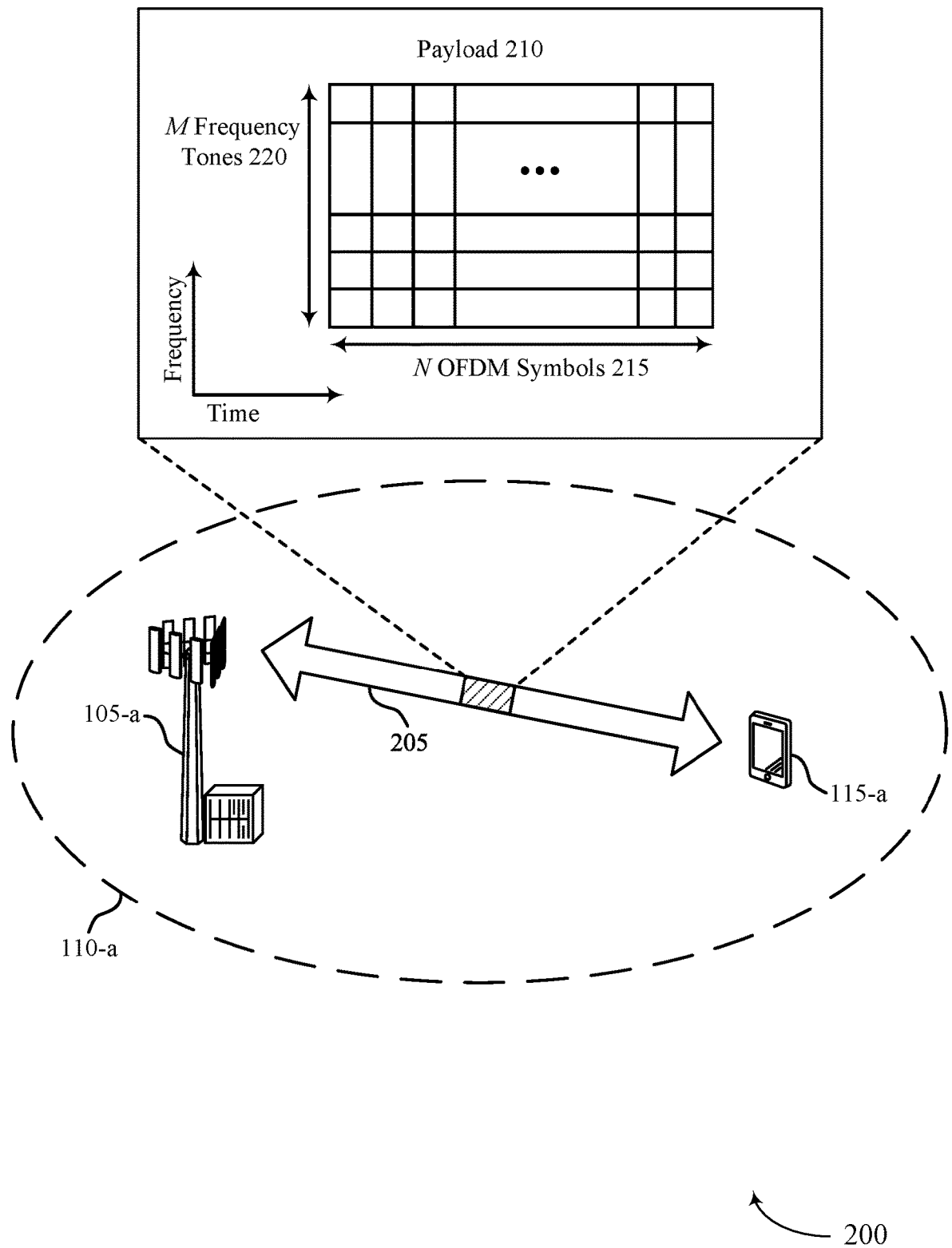
FIG. 2 illustrates an example of a wireless communications system that supports sequence partitioning for a multi-user uplink channel in accordance with aspects of the present disclosure.

FIG. 2 illustrates an example of a wireless communications system 200 that supports sequence partitioning for a multi-user uplink channel in accordance with aspects of the present disclosure. In some examples, the wireless communications system 200 may implement aspects of the wireless communications system 100. The wireless communications system 200 may include a UE 115-a and a base station 105-a, which may be examples of corresponding devices as described herein. The UE 115-a and the base station 105-a may communicate via a communication link 205 within a geographic coverage area 110-a. In some examples, the UE 115 may transmit a signal including a payload 210 to the base station 105-a via the communication link 205. The payload 210 may occupy a resource allocation of N OFDM symbols 215 and M frequency tones 220 and the UE 115 may convey the payload 210 using a sequence based on the N OFDM symbols 215 and the M frequency tones 220.

As described herein, N may correspond to any quantity or number, but may sometimes be defined within the range of 1 to 14. Similarly, M may correspond to any quantity or number, but may sometimes be defined within the range of 1 to 12. In some cases, such as when N=14 and M=12, the resource allocation may be a resource block. Further, as described herein, the payload 210 may be an example of any signal including information (e.g., a quantity of bits) and, although described in the context of transmission from the UE 115-*a*, may be transmitted by either the UE 115-*a* or the base station 105-*a*. In some examples, the payload 210 may be an example of uplink control information and, accordingly, the UE 115-*a* may transmit the payload 210 using a resource allocation of a PUCCH. In such examples, the N OFDM symbols 215 and the M frequency tones 220 may correspond to a time and frequency resource grid assigned to the PUCCH for the UE 115-*a* to transmit the payload 210.

In some examples, the UE 115-*a* and the base station 105-*a* may support sequence-based transmissions and the UE 115-*a* may transmit the payload 210 over the resource allocation using a selected sequence (or codepoint). To enable the UE 115-*a* to convey the payload 210 over the resource allocation, the sequence may have a length corresponding to the quantity of resource elements of the resource allocation. For example, the UE 115 may use a resource allocation of N OFDM symbols 215 and M frequency tones 220 and, accordingly, the UE 115-*a* may use a sequence having a length equal to N*M. In some cases, the UE 115-*a* may use a non-orthogonal sequence to convey the payload 210. In some other cases, the UE 115-*a* may use an orthogonal sequence to convey the payload 210. In some aspects, orthogonal sequences may enable the UE 115-*a* to meet low-latency or high reliability constraints of the wireless communications system 200, which may increase the likelihood for successful communications between the UE 115-*a* and the base station 105-*a*. In either case, the UE 115-*a* may select a sequence from a set of sequences associated with the resource allocation (e.g., a set of sequences all having a length equal to N*M).

Some resource allocations, such as a PUCCH resource allocation, may be associated with different formats that enable a multi-user design. For example, in the case that the resource allocation is a PUCCH, a PUCCH format 0, 1, or 4 may support a multi-user design and, as such, multiple users (e.g., a first UE 115-*a* and a second UE 115-*a*) may share the same PUCCH resource. In some cases, however, sequence-based transmissions over a PUCCH may be unable to support such a multi-user design.

In some implementations of the present disclosure, the UE 115-*a* or the base station 105-*a*, or both, may identify a set of sequences and may determine a configuration for partitioning the set of sequences into different sequence pools, each sequence pool usable by a different UE 115-*a*. For example, the UE 115-*a* may select a sequence for conveying the payload 210 from one of the sequence pools while other UEs 115-*a* may select sequences for conveying a payload from different sequence pools. For example, the base station 105-*a* may determine the configuration for partitioning the set of sequences and may transmit the configuration to the UE 115-*a*. The UE 115-*a* may receive the configuration and generate or otherwise determine the sequence pool associated with the UE 115-*a* (e.g., the sequence pool from which the UE 115-*a* may select sequences) based on the configuration.

The base station 105-*a* may transmit the configuration to a quantity of other UEs 115-*a* in addition to the UE 115-*a* and each of the other UEs 115-*a* may similarly generate or otherwise determine a different sequence pool based on the configuration. For example, the base station 105-*a* may transmit a configuration for partitioning the set of sequences to a first UE 115-*a* and to a second UE 115-*a*. The first UE 115-*a* may determine a first sequence pool associated with the first UE 115-*a* based on the configuration. Similarly, the second UE 115-*a* may determine a second sequence pool associated with the second UE 115-*a* based on the configuration. As such, the first UE 115-*a* and the second UE 115-*a* may select sequences from different sequence pools, which may enable the first UE 115-*a* to transmit a first payload 210 to the base station 105-*a* and the second UE 115-*a* to transmit a second payload 210 to the base station 105-*a* using the same resource allocation (e.g., the same N OFDM symbols 215 and M frequency tones 220).

In examples in which the set of sequences include non-orthogonal sequences, the UE 115-*a* or the base station 105-*a*, or both, may determine the sequence pool associated with the UE 115-*a* based on one or more parameters and a pseudo-random random number generator (e.g., a pseudo-random random sequence generator). For example, the UE 115-*a* or the base station 105-*a*, or both, may use an initial seed as an input into the pseudo-random random number generator to determine the sequence pool associated with the UE 115-*a*. For example, the UE 115-*a* or the base station 105-*a*, or both, may determine an initial seed based on a UE ID, a slot ID, a frame ID, or any combination thereof (e.g., the initial seed may be a function of the UE ID, the slot ID, the frame ID, or any combination thereof) and may use the initial seed as an input into the pseudo-random random number generator. In some aspects, the base station 105-*a* may determine the value of the initial seed and may signal the initial seed to the UE 115-*a*. In such aspects, the base station 105-*a* may use the initial seed to align the sequence pool generated using the initial seed with other sequence pools associated with other UEs 115-*a*. Based on using a pseudo-random random number generator, the UE 115-*a* and the base station 105-*a* may determine the same sequence pool if the UE 115-*a* and the base station 105-*a* use the same input (e.g., the same initial seed derived from the same UE ID, the same slot ID, the same frame ID, or any combination thereof).

In examples in which the set of sequences includes orthogonal sequences, the UE 115-*a* or the base station 105-*a*, or both, may determine the sequence pool associated with the UE 115-*a* prior to or after generating the set of sequences. In examples in which the UE 115-*a* or the base station 105-*a*, or both, determine the sequence pool associated with the UE 115-*a* prior to generating the set of sequences, the UE 115-*a* or the base station 105-*a*, or both, may identify a subset of indices of an orthogonal matrix and a subset of indices of a base sequence that the UE 115-*a* or the base station 105-*a*, or both, may use to generate orthogonal sequences. In some aspects, the UE 115-*a* or the base station 105-*a*, or both, may identify the subset of indices of the orthogonal matrix and the subset of indices of the base sequence based on the configuration for partitioning the set of sequences. In some cases, the indices of the orthogonal matrix may correspond to rows or columns of the orthogonal matrix and indices of the base sequence may correspond to cyclic shifts (e.g., cyclic shift indices) of the base sequence. As such, the UE 115-*a* or the base station 105-*a*, or both, may select the rows or columns of the orthogonal matrix corresponding to the subset of indices of the orthogonal matrix and may select the cyclic shifts of the base sequence based on the subset of indices of the base sequence and may generate the sequence pool associated with the UE 115-*a* based on a product of the select rows or columns of the orthogonal matrix and the select cyclic shifts of the base sequence. Additional details relating to generating the sequence pool of orthogonal sequences using an orthogonal matrix and a base sequence are described herein, including with reference to FIGS. 5A and 5B.

In examples in which the UE 115-a or the base station 105-a, or both, determine the sequence pool associated with the UE 115-a after generating the set of sequences (e.g., a set of orthogonal sequences), the UE 115-a or the base station 105-a, or both, may initially generate the set of sequences based on a product of the orthogonal matrix and the base sequence. For example, the UE 115-a or the base station 105-a, or both, may determine a product of all rows or columns of the orthogonal matrix and all cyclic shifts of the base sequence to generate the set of orthogonal sequences associated with the resource allocation. In some examples, the quantity of the set of orthogonal sequences generated by the UE 115-a or the base station 105-a, or both, may be based on the resource allocation for conveying the payload 210. For example, the base station 105-a may allocate N OFDM symbols 215 and M frequency tones 220 for transmission of the payload 210 and, accordingly, the UE 115-a or the base station 105-a, or both, may generate a quantity of sequences equal to N*M. As such, the UE 115-a or the base station 105-a, or both, may generate a set of N*M orthogonal sequences.

Upon generating the set of sequences (e.g., the set of N*M orthogonal sequences), the UE 115-a or the base station 105-a, or both, may identify a subset of indices of the orthogonal matrix and a subset of indices of the base sequence based on the configuration for partitioning the set of sequences and may determine which sequences from the set of sequences to include in the sequence pool associated with the UE 115-a based on the subset of indices of the orthogonal matrix and the subset of indices of the base sequence. For example, the UE 115-a or the base station 105-a, or both, may determine which sequences correspond to (e.g., are the product of) the subset of indices of the orthogonal matrix and the subset of indices of the base sequence and may select such sequences for the sequence pool associated with the UE 115-a. Additionally or alternatively, the UE 115-a or the base station 105-a, or both, may determine the sequence pool associated with the UE 115-a based on identifying a continuous block of sequences of the set of sequences that are addressed to the sequence pool associated with the UE 115-a. In some examples, the addressing of the continuous block of sequences to the sequence pool associated with the UE 115-a may be included in the configuration. Alternatively, the UE 115-a or the base station 105-a may determine the sequence pool associated with the UE 115-a based on identifying an interleaving granularity value, as described in more detail with reference to FIG. 4.

In any of the above examples (i.e., generating the sequence pool including non-orthogonal sequences, generating the sequence pool including orthogonal sequences, or determining the sequence pool from a generated set of orthogonal sequences), the UE 115-a or the base station 105-a, or both, may determine a subset of sequences from the sequence pool associated with the UE 115-a based on the payload 210. For example, the UE 115-a or the base station 105-a, or both, may determine a size of the payload 210 (e.g., a quantity of bits included in the payload 210) and may determine a subset of sequences from the sequence pool associated with the UE 115-a based on the size of the payload 210. For instance, the payload 210 may include a quantity of bits equal to K and, accordingly, the quantity of sequences within the determined subset of sequences may be based on the value of K. In some implementations, for example, the UE 115-a or the base station 105-a, or both, may select a quantity of sequences equal to $2^K$ for inclusion in the subset of sequences based on identifying that the payload 210 includes K bits. In some cases, the UE 115-a or the base station 105-a, or both, may select $2^K$ sequences because $2^K$ sequences may provide one sequence for each possible value (i.e., permutation) of K bits.

In some implementations, the UE 115-a or the base station 105-a, or both, may determine the $2^K$ sequences from the sequence pool associated with the UE 115-a based on achieving a maximum spacing between the sequences of the sequence pool associated with the UE 115-a. For example, the UE 115-a or the base station 105-a, or both, may determine the subset of sequences from the sequence pool associated with the UE 115-a based on selecting $2^K$ sequences from the sequence pool with the largest spacing or distance between them. In some other implementations, the base station 105-a may signal the spacing or offset between each of the subset of sequences in the sequence pool associated with the UE 115-a and the UE 115-a may determine the $2^K$ sequences based on the signaled spacing or offset. In some examples in which the sequence pool associated with the UE 115-a includes orthogonal sequences, the UE 115-a or the base station 105-a, or both, may determine the $2^K$ sequences from the sequence pool associated with the UE 115-a based on achieving a maximum spacing (or a signaled spacing) between indices of the orthogonal matrix (e.g., the subset of indices of the orthogonal matrix) and the indices of the base sequence (e.g., the subset of indices of the base sequence). In such examples, the UE 115-a and the base station 105-a may achieve spacing in the time domain and in the frequency domain. In some aspects, the base station 105-a may signal a starting index of the sequence pool associated with the UE 115-a and the UE 115-a may begin selecting the $2^K$ sequences from the sequence pool associated with the UE 115-a at the sequence corresponding to the starting index.

As such, the UE 115-a or the base station 105-a, or both, may identify a subset of sequences (e.g., a subset of $2^K$ sequences) from which the UE 115-a may select a sequence to convey the payload 210. The UE 115-a or the base station 105-a, or both, may include the selected subset of sequences in a constructed codebook. In some aspects, the UE 115-a or the base station 105-a, or both, may construct the codebook such that each sequence of the subset of sequences in the codebook is associated with an index in the codebook. The base station 105-a may additionally identify a subset of sequences of other sequence pools associated with other UEs 115-a. For example, the set of sequences may be partitioned into i sequence pools and the base station 105-a and each $i^{th}$ UE 115-a may identify $2^{K_i}$ sequences (e.g., each $i^{th}$ UE 115-a may transmit a payload including $K_i$ bits) from an $i^{th}$ sequence pool to include in an $i^{th}$ codebook.

The UE 115-a may select a sequence from the subset of sequences (e.g., from the constructed codebook) to convey the payload 210 based on the bits in the payload 210. For example, the UE 115-a may identify a bit stream (e.g., successive values of a quantity of bits) of the payload 210 and may select a sequence from the codebook based on the bit stream. The bit stream may be represented as $b_0$, $b_1$, $b_2$, ..., $b_{K-1}$, where b corresponds to a value of a bit and K is equal to the quantity of bits in the payload 210. In some implementations, the UE 115-a may convert the bit stream into a number (e.g., a decimal number), such as k, that may correspond to a sequence of the subset of sequences. For example, k may correspond to or map to an index in the codebook of the subset of sequences. As such, the UE 115-a may convert the bit stream of the payload 210 into the value k and may determine which sequence of the subset of sequences corresponds to the index value of k (e.g., the UE 115-a may select or otherwise determine the $k^{th}$ sequence in the constructed codebook). Accordingly, the UE 115-a may select the sequence corresponding to the index value of k and may transmit the payload 210 using the selected sequence.

The UE 115-a and the base station 105-a, implementing the described techniques, may partition a set of sequences associated with a resource allocation into multiple different (e.g., non-overlapping) sequence pools, where each sequence pool is associated with a different UE 115-a. As such, the wireless communications system 200 may support a multi-user design for sequence-based transmissions (e.g., sequence-based transmissions over an uplink control channel). For example, multiple UEs 115-a may transmit a payload using the same resource allocation based on selecting a sequence to convey the payload 210 from different sequence pools. Moreover, the UE 115-a or the base station 105-a, or both, may efficiently construct a codebook of sequences from the sequence pool associated with the UE 115-a and select one of the sequences to convey the payload 210 based on the quantity of bits in the payload 210, which may increase the likelihood that the base station 105-a is able to successfully receive the payload 210 while avoiding unnecessary storage costs associated with storing the full set of sequences. Moreover, some implementations of the described techniques may support and maintain a low peak-to-average-power ratio (PAPR) associated with the transmission of the payload 210, which may enable to the UE 115-a to more use a greater transmit power when transmitting the payload 210.

Although described in the context of communication between a base station 105-a and a UE 115-a, similar operations and techniques may apply to communication between two UEs 115-a. For example, a first UE 115-a may determine a sequence pool associated with the first UE 115-a and select a sequence from a codebook to convey a payload 210, as described herein, and may transmit the payload 210 to a second UE 115-a on a sidelink channel. In such examples, the first UE 115-a may receive signaling related to determining the sequence pool associated with the first UE 115-a and the codebook from the base station 105-a or from the second UE 115-a, in which examples the signaling may originate from the second UE 115-a or the second UE 115-a may act as a relay node between the base station 105-a and the first UE 115-a.

Further, although described herein as being performed by the UE 115-a, similar operations and techniques may be performed by the base station 105-a. For example, the base station 105-a may select a sequence from a sequence pool associated with the base station 105-a to convey the payload 210 using similar techniques as those which are described as being done by the UE 115-a. The base station 105-a may transmit the payload using the selected sequence, which may increase the likelihood that the UE 115-a (e.g., in the case of transmission of the payload 210 on a downlink channel) or another base station 105-a (e.g., in the case of transmission of the payload over a sidelink channel or via a wireless backhaul connection) is able to successfully receive the payload 210 while avoiding unnecessary storage costs associated with storing the full set of sequences. In some examples, the base station 105-a may receive signaling related to determining the sequence pool associated with the base station 105-a and the codebook from the UE 115-a, another base station 105-a, or may determine the sequence pool associated with the base station 105-a and the codebook without receiving signaling from another device. Moreover, the base station 105-a, based on implementing the described techniques, may maintain a low PAPR associated with the transmission of the payload 210, which may enable to the base station 105-a to use a greater transmit power when transmitting the payload 210.

Figure 3:
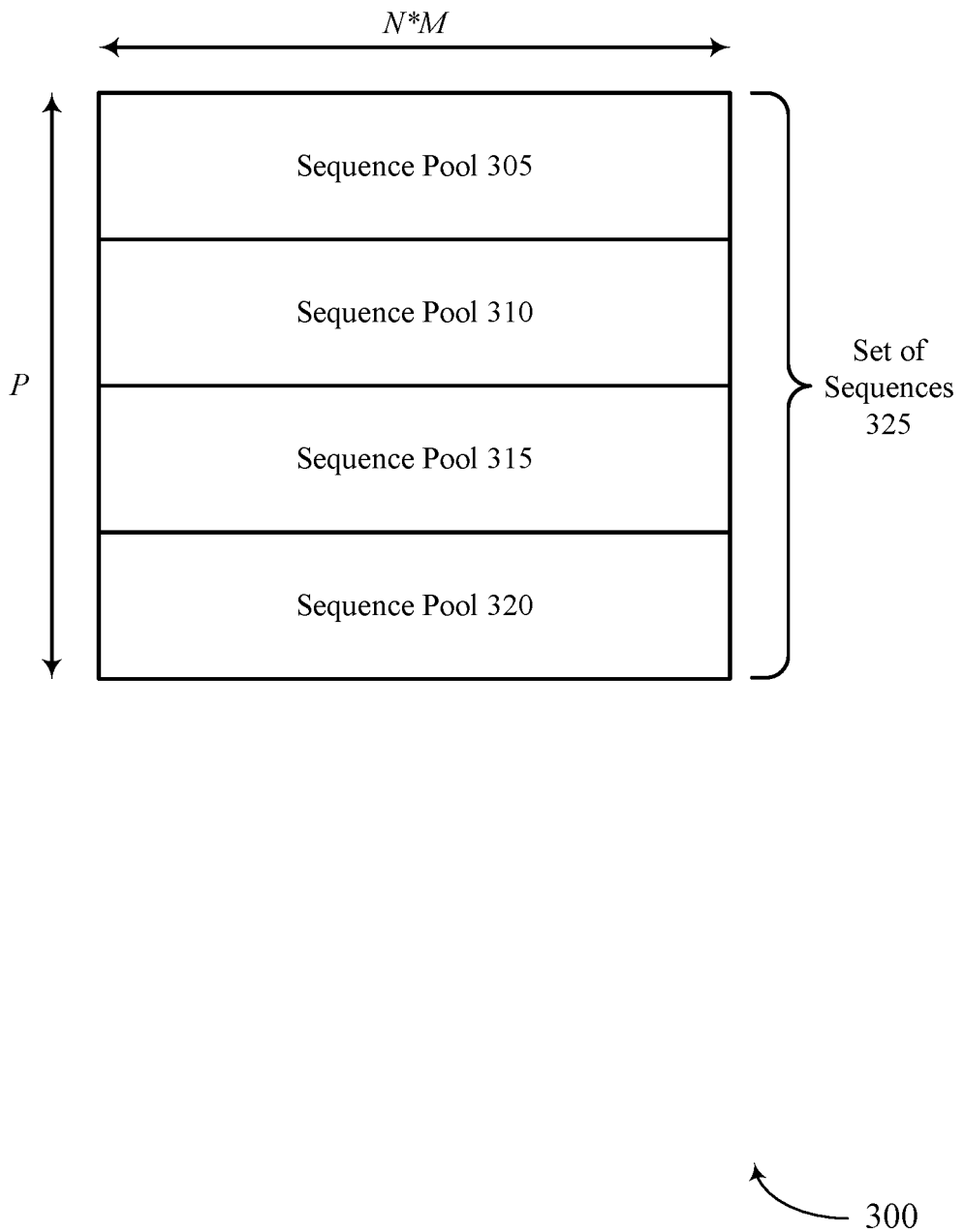
FIG. 3 illustrates an example sequence partitioning that supports sequence partitioning for a multi-user uplink channel in accordance with aspects of the present disclosure.

FIG. 3 illustrates an example sequence partitioning 300 that supports sequence partitioning for a multi-user uplink channel in accordance with aspects of the present disclosure. In some examples, the sequence partitioning 300 may be realized by implementing aspects of the wireless communications system 100 or the wireless communications system 200. The sequence partitioning 300 illustrates an example partitioning of a set of sequences 325 that may be used by multiple UEs 115 and a base station 105 to convey multiple payloads over a resource allocation. In some examples, a UE 115 (e.g., one of the multiple UEs 115) or a base station 105 may determine the sequence partitioning 300 based on a configuration for partitioning the set of sequences 325. The UE 115 and the base station 105 may be examples of corresponding devices as described herein.

As described in more detail herein, including with reference to FIG. 2, a UE 115 may transmit a payload to a base station 105 over a resource allocation using a selected sequence from a sequence pool associated with the UE 115. The UE 115 or the base station 105, or both, may determine the sequence pool associated with the UE 115 based on a configuration for partitioning the set of sequences 325. The set of sequences 325 may include non-orthogonal sequences or orthogonal sequences. Each sequence of the set of sequences 325 may have a length based on the size (e.g., the quantity of resource elements) of the resource allocation for transmitting the payload. For example, the resource allocation may include N OFDM symbols and M frequency tones and, as such, each sequence of the set of sequences may have a length equal to N*M (e.g., the resource allocation may include N*M resource elements).

The set of sequences 325 may include a quantity of P sequences. In examples in which the set of sequences 325 includes non-orthogonal sequences, P may be any arbitrary quantity. In examples in which the set of sequences 325 includes orthogonal sequences, P may be equal N*M. In some aspects, each sequence of the set of sequences 325 may be a sequence of numbers. In some examples of the present disclosure, the UE 115 or the base station 105, or both, may partition the set of sequences 325 into a quantity of different sequence pools. The quantity of sequence pools may be based on the quantity of UEs 115 that may transmit a payload in the same resource allocation (e.g., in the same resource block). For example, four UEs 115 may transmit a payload using the same resource allocation and each of the four UEs 115 or the base station 105 may partition the set of sequences 325 into a sequence pool 305, a sequence pool 310, a sequence pool 315, and a sequence pool 320. Although four sequence pools and four UEs are described and illustrated, the described techniques may be applicable to any quantity of sequence pools (e.g., 2, 3, etc.) and any quantity of UEs 115 (e.g., 2, 3, etc.).

In some examples, each of the four UEs 115 may receive the configuration for partitioning the set of sequences 325 and may determine the sequence pool associated with that UE 115. For example, a first UE 115 may receive the configuration from the base station 105 and may generate or otherwise determine the first sequence pool 305 that is associated with the first UE 115. In some examples, the first UE 115 may generate the first sequence pool 305 based on inputting an initial seed into a pseudo-random random number generator. In some aspects, the first UE 115 may receive an indication of a UE ID from the base station 105-*a* (e.g., the configuration received from the base station 105-*a* may include the UE ID), identify a slot ID or a frame ID based on a current time-domain location of the UE 115, and determine the initial seed based on the UE ID, the slot ID, the frame ID, or any combination thereof. The base station 105-*a* may similarly determine that the sequence pool 305 is associated with the first UE 115 based on inputting the initial seed into a pseudo-random random number generator at the base station 105. The base station 105 may also determine the initial seed based on the UE ID (e.g., the UE ID associated with the first UE 115), a slot ID, a frame ID, or any combination thereof.

In some specific examples, the UE 115 or the base station 105, or both, may generate the sequence pool associated with the UE 115 based on a maximum length sequence generator or a Gold sequence generator. A maximum length sequence generator may generate a maximum length sequence which, in some aspects, may be referred to as an m-sequence. A Gold sequence may be generated by selecting two maximum length sequences of the same length (e.g., $2^m-1$). The set of $2^m-1$ exclusive ors (i.e., XORs) of the two maximum length sequences in their various phases together with the two maximum length sequences form a set of $2^m+1$ Gold sequences.

In some aspects, the base station 105-*a* may control or adjust the value of the initial seed (e.g., by controlling the UE ID) to align the sequence pool 305 with other sequence pools of the set of sequences 325. For example, the base station 105 may control the value of the initial seed to align the sequence pool 305 with the sequence pool 310 such that the sequence pool 305 and the sequence pool 310 both include sequences of the set of sequences 325 without overlapping. For instance, the maximum length sequence generator or the Gold sequence generator may output a quantity of sequences and, based on the initial seed input to the maximum length sequence generator or the Gold sequence generator, the maximum length sequence generator or the Gold sequence generator may output sequences starting at different locations in the set of sequences 325 such that each output (e.g., each sequence pool) is non-overlapping with other outputs (e.g., other sequence pools) of the maximum length sequence generator or the Gold sequence generator. In some cases, the upper limit of unique sequences (e.g., non-repetitive sequences) that the maximum length sequence generator or the Gold sequence generator may generate is based on a shift register (e.g., a linear feedback shift register). For example, if the shift register is a 10-bit shift register (e.g., a length-10 register), the maximum length sequence generator or the Gold sequence generator may generate up to $2^{10}$ (or $2^{10}+/-1$) unique sequences. For example, the set of sequences may be based on a polynomial (e.g., the maximum length sequence generator, the Gold sequence generator, or other pseudo-random random number generator may be deterministic and defined by a function, such as the polynomial) and, for a 10-bit shift register, the order of the polynomial may be $2^{10}$. In such cases, the maximum length sequence generator may output a sequence of length $2^{10}-1$, which may correspond to a set of sequences 325 including $2^{10}$ sequences (or $2^{10}+/-1$ sequences).

Alternatively, the first UE 115 may generate the sequence pool 305 based on a product of a subset of indices of an orthogonal matrix and a subset of indices of a base sequence. In some examples, the first UE 115 may identify the subset of indices of the orthogonal matrix and the subset of indices of the base sequence based on the configuration received from the base station 105. Such generation of the sequence pool 305 may be an example of constructing the sequence pool 305 by partitioning the orthogonal matrix and partitioning the base sequence before determining the product of the orthogonal matrix and the base sequence. In some cases, the orthogonal matrix may be a DFT matrix and, as such, partitioning the orthogonal matrix may equivalently be referred to as partitioning the DFT domain. Likewise, the base sequence may be a cyclically shifted base sequence and, as such, partitioning the base sequence may equivalently be referred to as partitioning the cyclic shift domain.

In some examples, the configuration for partitioning the set of sequences 325 may partition each of the orthogonal matrix and the base sequence into a quantity of different subsets of indices (e.g., where indices of the orthogonal matrix refer to rows or columns of the orthogonal matrix and indices of the base sequence refer to cyclic shifts of the base sequence). For example, the configuration may indicate a first subset of indices of the orthogonal matrix, a second subset of indices of the orthogonal matrix, a first subset of indices of the base sequence, and a second subset of indices of the base sequence and also indicate which subset of indices the first UE 115 may use to generate the sequence pool 305. In such examples, the first subset of indices of the orthogonal matrix may include half of the rows or columns of the orthogonal matrix and the second subset of indices of the orthogonal matrix may include the other half. Likewise, the first subset of indices of the base sequence may include half of the cyclic shift indices of the base sequence and the second subset of indices of the base sequence may include the other half. As such, the first UE 115 may generate the sequence pool by determining the product (e.g., the Kronecker product) of either of the first subset of indices or the second subset of indices of the orthogonal matrix and either of the first subset of indices or the second subset of indices of the base sequence. Additional details relating to such generation of the sequence pool 305 are described herein, including with reference to FIGS. 5A and 5B.

Alternatively, the first UE 115 may determine the sequence pool 305 based on generating the set of sequences 325 and selecting sequences from the generated set of sequences 325. In some examples, the first UE 115 may generate the set of sequences based on determining the product of the orthogonal matrix (e.g., the full, non-partitioned orthogonal matrix) and the base sequence (e.g., all cyclic shift indices of the base sequence), as described in more detail with reference to FIGS. 5A and 5B. In some implementations, the UE 115-*a* may select sequences from the set of sequences 325 that are continuous (e.g., non-interleaved). For example, the UE 115 may determine to include a continuous block of sequences of the set of sequences 325 in the sequence pool 305 based on the configuration for partitioning the set of sequences 325. In such examples, the configuration may include an indication for the UE 115 to perform continuous partitioning and an indication of which continuous block of sequences belong to the sequence pool 305 associated with the UE 115. In some aspects, such continuous partitioning may increase the distance between the sequences used by different UEs 115, which may result in lower inter-UE interference. In some other implementations, the UE 115-*a* may select sequences from the set of sequences 325 that are inter-leaved with other sequences of the set of sequences 325, as described in more detail with reference to FIG. 4.

A second UE 115, a third UE 115, and a fourth UE 115 may similarly receive the configuration from the base station 105 and may generate or otherwise determine a sequence pool 310, a sequence pool 315, and a sequence pool 320, respectively. Accordingly, the first UE 115 may select a first subset of sequences from the sequence pool 305 to construct a first codebook, the second UE 115 may select a second subset of sequences from the sequence pool 310 to construct a second codebook, the third UE 115 may select a third subset of sequences from the sequence pool 315 to construct a third codebook, and the fourth UE 115 may select a fourth subset of sequences from the sequence pool 320 to construct a fourth codebook.

Further, although described in the context of the four UEs 115, the base station 105 may perform similar or complementary operations to each of the four UEs 115 to determine which sequence pools of the set of sequences 325 may be used by each of the four UEs 115. For example, the base station 105 may determine that the sequence pool 305 is associated with the first UE 115, that the sequence pool 310 is associated with the second UE 115, that the sequence pool 315 is associated with the third UE 115, and that the sequence pool 320 is associated with the fourth UE 115 and may transmit the configuration for partitioning the set of sequences into the four sequence pools to the four UEs 115. Accordingly, the base station 105 may configure each of the four UEs 115 to generate or otherwise determine four different sequence pools and to select sequences for conveying a payload using the four different sequence pools. As such, each of the four UEs 115 may transmit a payload to the base station 105 using different sequences over the same resource allocation.

Figure 4:
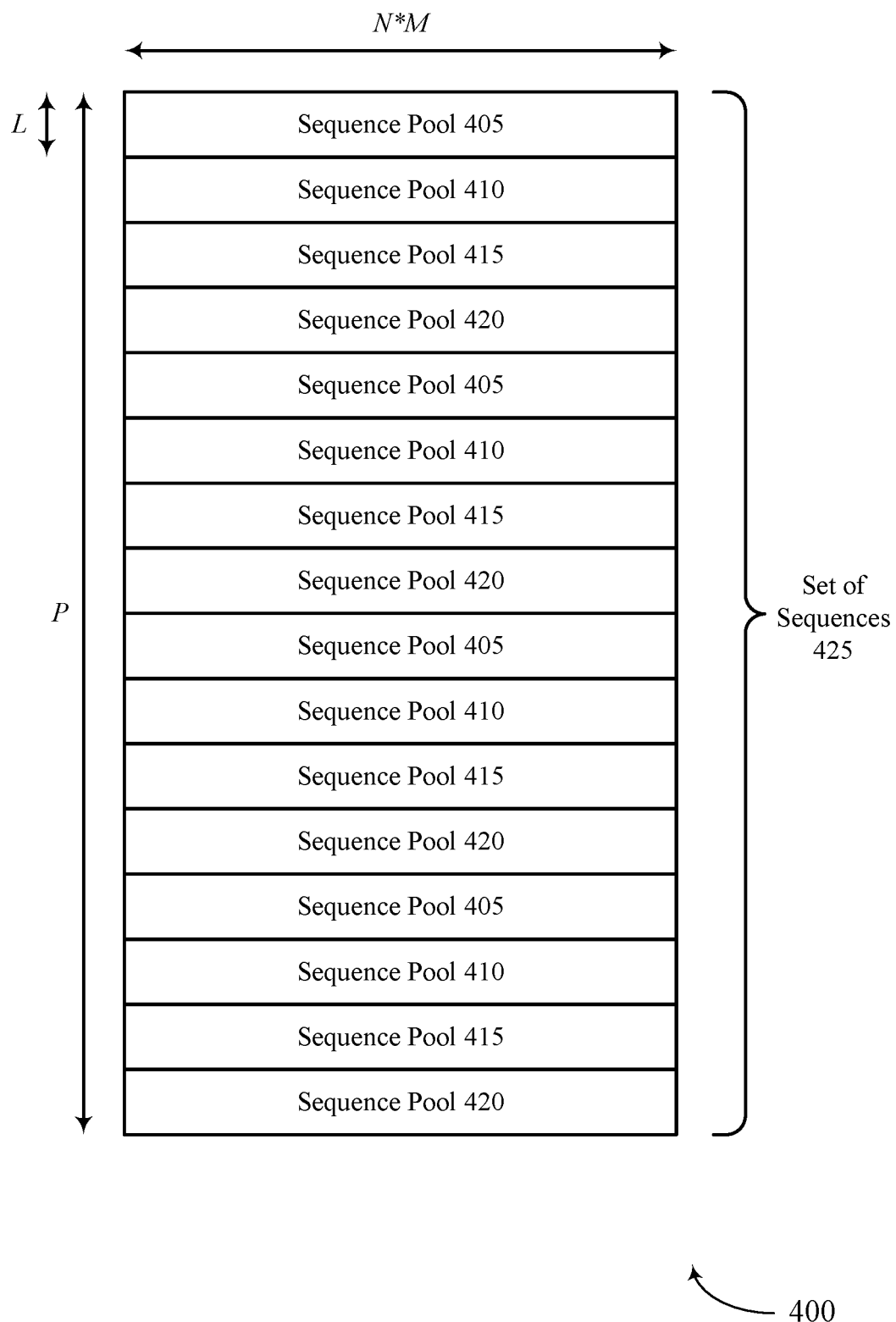
FIG. 4 illustrates an example sequence partitioning that supports sequence partitioning for a multi-user uplink channel in accordance with aspects of the present disclosure.

FIG. 4 illustrates an example sequence partitioning 400 that supports sequence partitioning for a multi-user uplink channel in accordance with aspects of the present disclosure. In some examples, the sequence partitioning 400 may be realized by implementing aspects of the wireless communications system 100 or the wireless communications system 200. The sequence partitioning 400 illustrates an example partitioning of a set of sequences 425 that may be used by multiple UEs 115 and a base station 105 to convey a payload over a resource allocation. In some examples, a UE 115 (e.g., one of the multiple UEs 115) or a base station 105, or both, may determine the sequence partitioning 400 based on a configuration for partitioning the set of sequences 425. The UE 115 and the base station 105 may be examples of corresponding devices as described herein.

The sequence partitioning 400 illustrates an example of interleaved partitioning where each sequence pool may be interleaved with other sequence pools in the set of sequences 425. The set of sequences 425 may include non-orthogonal sequences or orthogonal sequences. Each sequence of the set of sequences 425 may have a length based on the size (e.g., the quantity of resource elements) of the resource allocation for transmitting the payload. For example, the resource allocation may include N OFDM symbols and M frequency tones and, as such, each sequence of the set of sequences may have a length equal to N*M (e.g., the resource allocation may include N*M resource elements). The set of sequences 425 may include a quantity of P sequences. In examples in which the set of sequences 425 includes non-orthogonal sequences, P may be any arbitrary quantity. In examples in which the set of sequences 425 includes orthogonal sequences, P may be equal N*M. In some aspects, each sequence of the set of sequences 425 may be a sequence of numbers.

In some examples of the present disclosure, the base station 105 may determine a configuration for partitioning the set of sequences 425 into four sequences that may each be used by a different UE 115 and may determine an interleaving granularity value L for interleaving the four sequences. In some aspects, the base station 105 may configure L to interleave the sequence pools per block of L sequences (e.g., L>1) or configure L to interleave the sequence pools per sequence (e.g., L=1). In some aspects, the base station 105 may configure the interleaving granularity L at each of the different UEs 115 via RRC signaling.

In some examples, a first UE 115 may identify (e.g., generate based on a product of an orthogonal matrix and a base sequence in some implementations) the set of sequences 425 and may select or otherwise determine which sequences of the set of sequences 425 to include in a sequence pool 405 associated with the first UE 115 based on the interleaving granularity L, the quantity of sequence pools or UEs 115 using the same set of sequences 425 (e.g., four), and, in some cases, a starting index or a relative position of the first UE 115 to other UEs 115 using the same set of sequences 425. For example, the first UE 115 may identify a starting index of the set of sequences 425 from which to begin selecting sequences to include in the sequence pool 405 associated with the first UE 115. As illustrated in sequence partitioning 400, the starting index for sequences in the sequence pool 405 may be zero (e.g., the first, or top-most sequence of the set of sequences 425 may be included in the sequence pool 405). In some aspects, the starting index may be based on the relative position of the UEs 115. For example, a second UE 115 may identify a starting index of L, a third UE 115 may identify a starting index of 2*L, and a fourth UE 115 may identify a starting index of 3*L.

Upon determining the starting index of the sequence pool 405, the first UE 115 may determine that a first quantity of sequences is in the sequence pool 405 corresponding to the next L sequences from the starting index. The first UE 115 may determine the location of a second quantity of sequences that is also in the sequence pool 405 based on a product the quantity of sequence pools or the quantity of UEs 115 using the same set of sequences 425 and the interleaving granularity L. For instance, in examples in which the set of sequences 425 are partitioned into four sequence pools, the first UE 115 may determine that the location of the second quantity of sequences begin a quantity of sequences equal to 3*L from the last sequence of the first quantity of sequences in the sequence pool 405. Upon identifying the location of the second quantity of sequences, the first UE 115 may determine that the second quantity of sequences corresponding to the next L sequences from the location of the beginning of the second quantity of sequences are in the sequence pool 405. The first UE 115 may repeatedly perform such an operation to identify the interleaved sequences in the sequence pool 405 until the UE 115 reaches an end of the set of sequences 425. In some examples, such interleaved partitioning may increase the distance between the sequences used by a UE 115 (e.g., increase the distance between sequences within one sequence pool), which may result in lower intra-UE error among the different sequences.

The second UE 115, the third UE 115, and the fourth UE 115 may perform similar operations to identify the interleaved sequences of the sequence pools associated with each of the second UE 115, the third UE 115, and the fourth UE 115, namely the sequence pool 410, the sequence pool 415, and the sequence pool 420, respectively. Accordingly, the first UE 115 may select a first subset of sequences from the sequence pool 405 to construct a first codebook a, the second UE 115 may select a second subset of sequences from the sequence pool 410 to construct a second codebook, the third UE 115 may select a third subset of sequences from the sequence pool 415 to construct a third codebook, and the fourth UE 115 may select a fourth subset of sequences from the sequence pool 420 to construct a fourth codebook.

Further, although described in the context of the four UEs 115, the base station 105 may perform similar or complementary operations to each of the four UEs 115 to determine which sequence pools of the set of sequences 425 may be used by each of the four UEs 115. For example, the base station 105 may determine that the sequence pool 405 is associated with the first UE 115, that the sequence pool 410 is associated with the second UE 115, that the sequence pool 415 is associated with the third UE 115, and that the sequence pool 420 is associated with the fourth UE 115 and may transmit the configuration for partitioning the set of sequences into the four sequence pools to the four UEs 115. Additionally, the base station 105 may signal the interleaving granularity L to each of the four UEs 115 via RRC signaling. Accordingly, the base station 105 may configure each of the four UEs 115 to generate or otherwise determine four different sequence pools and to select sequences for conveying a payload using the four different sequence pools. As such, each of the four UEs 115 may transmit a payload to the base station 105 using different sequences over the same resource allocation.

FIG. 5A illustrates an example of an orthogonal matrix 500 and a base sequence 501 that support sequence partitioning for a multi-user uplink channel in accordance with aspects of the present disclosure. In some examples, the orthogonal matrix 500 and the base sequence 501 may be implemented to realize aspects of the wireless communications system 100 or the wireless communications system 200. For example, the orthogonal matrix 500 and the base sequence 501 may be implemented, in some examples of the present disclosure, to realize the sequence partitioning 300 or the sequence partitioning 400. A UE 115 or a base station 105, or both, may use the orthogonal matrix 500 and the base sequence 501 to generate a sequence pool associated with the UE 115 or to generate a set of sequences (e.g., a set of orthogonal sequences) from which the UE 115-a or the base station 105, or both, may select sequences for a sequence pool associated with the UE 115. The UE 115 and the base station 105 may be examples of corresponding devices as described herein.

The orthogonal matrix 500, which may be referred to as W, may be an orthogonal, square matrix of size N (i.e., an N×N matrix). In some implementations, N may be equal to the quantity of symbols of a resource allocation associated with transmission of the payload, as described in more detail with reference to FIG. 2. Further, in some examples, the orthogonal matrix 500 may be a DFT matrix and, as such, may be equivalently referred to as a DFT matrix. Accordingly, a row or a column of the orthogonal matrix 500 (e.g., a vector) may be referred to as either $\vec{w}(n)$ or $\vec{DFT}(n)$, where n is an index of the row or the column of the orthogonal matrix 500 (e.g., the $n^{th}$ row or column).

Although FIG. 5A illustrates n=1, n may be equal to any number n=0, 1, 2, ..., N−1. A row of the orthogonal matrix 500 is defined by Equation 1, shown below.

$$\vec{DFT}(n)=[\omega^{0n},\omega^{1n}\omega^{2n},\ldots\omega^{in},\ldots,\omega^{(N-1)n}] \quad (1)$$

The corresponding column of the orthogonal matrix 500 may be equal to $\vec{DFT}(n)^T$. In Equation 1, $\omega$ may be defined as either $\omega=e^{-j2\pi/N}$ or $\omega=e^{j2\pi/N}$. Each column of the vector $\vec{DFT}(n)$ (or each row of the vector $\vec{DFT}(n)^T$) may correspond to an OFDM symbol index i, where i=0 in the first column (i.e., the left-most column) of the orthogonal matrix 500 and increments by one to i=N−1 in the last column (i.e., the right-most column) of the orthogonal matrix 500. In some cases, an OFDM symbol index i may correspond to an OFDM symbol of the resource allocation that the UE 115 may use to transmit the payload. In some cases, the phase ramp of a row or a column of the orthogonal matrix 500 may be defined as i*n, where i is the OFDM symbol index and n may describe the slope of the phase change. As such, a column or a row of the orthogonal matrix 500 may include entries for each OFDM symbol of the resource allocation in one frequency tone.

The base sequence 501, which may be equivalently referred to as a base sequence $\tilde{S}(m)$, may be a cyclically shifted frequency-domain base sequence. In other words, the base sequence 501 may be a frequency-domain base sequence S associated with a cyclic shift in the time-domain. As such, the base sequence S may be based on a cyclic shift index m, where m=0, 1, 2, ..., M−1. In some aspects, M may be equal to the quantity of frequency tones of a resource allocation associated with the transmission of the payload, as described in more detail with reference to FIG. 2. Equivalently, the base sequence S may be associated with a phase ramp vector in the frequency domain, such as $e^{-j2\pi lm/M}$ or $e^{j2\pi lm/M}$, and the phase ramp vector and the base sequence S may be multiplied together to determine the base sequence $\tilde{S}(m)$, as shown by base sequence 501.

For example, the UE 115 or the base station 105, or both, may take a DFT or a fast Fourier transform (FFT) of the base sequence S in the frequency-domain to convert the base sequence S to the time-domain, where the time-domain representation of the base sequence S, which may be referred to as $\tilde{S}$, has a length M. The UE 115 or the base station 105, or both, may apply a cyclic shift index m to $\tilde{S}$ to shift $\tilde{S}$ by index m, which may effectively move the entries of $\tilde{S}$ forward or backward by m in a cyclic fashion. The time-domain cyclic shift may correspond to the frequency-domain phase ramp vector $e^{-j2\pi lm/M}$ or $e^{j2\pi lm/M}$. The index m of the phase ramp may correspond to a slope of the phase ramp (e.g., the phase ramp may be defined as m/M) and the index l may correspond to a tone index of the resource allocation. As shown in base sequence 501, S(0), S(1), S(2), ..., S(l), ..., S(M−1) may correspond to entries of the base sequence S for each frequency tone l=0, 1, 2, ..., M−1. Accordingly, the base sequence 501 may include entries for each frequency tone of the resource allocation in one OFDM symbol.

In some cases, the base sequence 501 may be a cell-specific base sequence, such that each UE 115 within a cell of the base station 105 (e.g., within a geographic coverage area of the base station 105) may use the same base sequence 501. In some aspects, the base station 105 may transmit a signal to the UE 115 indicating which base sequence S to use. For example, the UE 115 and the base station may support a quantity of base sequences S (e.g., 30 base sequences S), and the base station 105 may signal to the UE 115 which base sequence S to use to generate a sequence pool associated with the UE 115. In some other aspects, the UE 115 may identify which base sequence to use to generate the sequence pool associated with the UE 115 based on running a pseudo-random random number generator (e.g., with an output of an index between 0 and 30) based in inputting a UE ID and a slot ID. In some cases, such determination of a base sequence based on the output of a pseudo-random random number generator may be referred to as base sequence hopping. Further, in some cases, the base sequence 501 may have a low PAPR property and may be referred to as a low PAPR sequence. In some cases, a cyclic shift in the time-domain and a phase ramp in the frequency domain may avoid affecting the PAPR of the base sequence, thus maintaining the PAPR associated with the base sequence 501.

As illustrated in FIG. 5A, the base sequence 501 may be a vector of size M×1. Additionally, there may be a quantity of base sequences 501 equal to the quantity of cyclic shift indices associated with the base sequence 501. For instance, there may be M base sequences 501 (i.e., one base sequence $\vec{s}(m)$ for each of m=0, 1, 2, . . . , M−1). Further, each row of the base sequence 501 may correspond to a frequency tone index l, where l=0 in the first row (i.e., the bottom row) and increments by one to l=M−1 in the last column (i.e., the top row). As such, each frequency tone index l may correspond to a frequency tone of the resource allocation associated with the transmission of the payload. Accordingly, a quantity of base sequences 501 (e.g., a quantity equal to M) may be considered, and the quantity of base sequences 501 may be visualized as a matrix of base sequences $\vec{s}(m)$ of dimensions M×M (e.g., M cyclic shifts × M frequency tones).

As described herein, the UE 115 or the base station 105, or both, may generate or otherwise determine a sequence pool associated with the UE 115 based on a configuration for partitioning a set of sequences. In some implementations, the UE 115 or the base station 105, or both, may generate the sequence pool associated with the UE 115 based on calculating or determining a product, such as a Kronecker product, of a subset of indices of the orthogonal matrix 500 and a subset of indices of the base sequence 501 (e.g., a select quantity of base sequences 501). For example, the configuration for partitioning the set of sequences may indicate that the sequence pool associated with the UE 115 includes sequences generated by a subset of the N rows or columns of the orthogonal matrix 500 and a subset of the M cyclic shifts of the base sequence 501. For instance, the UE 115 or the base station 105, or both, may determine the sequence pool associated with the UE 115 based on determining a Kronecker product of a reduced-size orthogonal matrix 500 (e.g., an orthogonal matrix 500 including a subset of the N rows or columns illustrated in FIG. 5A) and a reduced quantity of base sequences 501 (e.g., less than M cyclic shifts of the base sequence 501).

In an example of such implementations, the UE 115 or the base station 105, or both, may determine a first subset of indices n=0, 2, 4, 6, 8, 10, 12 of the orthogonal matrix 500 and a second subset of indices n=1, 3, 5, 7, 9, 11, 13 (e.g., where N=14) of the orthogonal matrix 500 and may determine a first subset of indices m=0, 2, 4, 6, 8, 10 of the base sequences 501 and a second subset of indices m=1, 3, 5, 7, 9, 11 (e.g., where M=12). In such examples (e.g., by dividing the orthogonal matrix 500 into two subsets of indices and the base sequences 501 into two subsets of indices), the set of sequences may be partitioned into four different sequence pools. For example, the UE 115 or the base station 105, or both, may use the first subset of indices of the orthogonal matrix 500 and the first subset of indices of the base sequences 501 to determine a first sequence pool, the first subset of the orthogonal matrix 500 and the second subset of indices of the base sequences 501 to determine a second sequence pool, the second subset of indices of the orthogonal matrix 500 and the first subset of indices of the base sequences 501 to determine a third sequence pool, or the second subset of indices of the orthogonal matrix 500 and the second subset of indices of the base sequences 501 to determine a fourth sequence pool. Although described in the context of two divisions of the orthogonal matrix and the base sequence, the described techniques may be equivalently applied to any quantity of subsets of indices of the orthogonal matrix 500 and the base sequence 501.

In some examples, the orthogonal matrix 500 (e.g., the DFT domain) may be sensitive to Doppler shift and the base sequence 501 (e.g., the cyclic shift domain) may be sensitive to channel delay spread. Accordingly, by enabling selection of different subsets of indices of either or both of the orthogonal matrix 500 and the base sequence 501, the UE 115 or the base station 105, or both, may customize or tune the partition of the orthogonal matrix 500 and the base sequence 501 to achieve a more optimal communication metrics (e.g., lower channel delay spread, less Doppler shift, etc.) based on the channel model. For example, if the channel has a high Doppler shift, the UE 115 or the base station 105, or both, may partition the orthogonal matrix 500 such that there is a larger distance between indices of the subset of indices of the orthogonal matrix 500. On the other hand, if the channel has a larger delay spread, the UE 115 or the base station 105, or both, may partition the base sequence 501 such that there is a larger distance between indices of the subset of indices of the base sequence 501.

In some other implementations, the UE 115 or the base station 105, or both, may generate the set of sequences (e.g., the set of orthogonal sequences) and select sequences from the generated set of sequences to determine the sequence pool associated with the UE 115. In such implementations, the UE 115 or the base station 105, or both, may generate the set of sequences based on a product, such as a Kronecker product, of the orthogonal matrix 500 (e.g., all N rows or columns of the orthogonal matrix 500) and each of the quantity of base sequences 501 (e.g., all M cyclic shift indices of the base sequence 501). The Kronecker product of the orthogonal matrix 500 and each of the quantity of base sequences 501 may involve determining the Kronecker product of each row or column n of the orthogonal matrix 500 and each cyclic shift index m of the base sequence 501, and repeating the operation for all permutations of n and m, where n=0, 1, . . . , N−1 and m=0, 1, . . . , M−1.

As such, the quantity of sequences in the set may be equal to the product of the dimensions of the orthogonal matrix 500 and a matrix representation of the base sequences 501. For instance, the orthogonal matrix 500 may be a matrix of size N×N and the base sequences 501 may be represented by a matrix of size M×M and, therefore, the Kronecker product between the two may result in an (N*M)×(N*M) matrix (e.g., an orthogonal (N*M)×(N*M) matrix). In other words, the UE 115 or the base station 105, or both, may generate a set of sequences equal to N*M and each sequence may have a length of N*M. Upon generating the set of sequences, the UE 115 or the base station 105, or both, may determine which sequences are in the sequence pool associated with the UE 115. In some examples, the UE 115 or the base station 105, or both, may determine which sequences are in the sequence pool associated with the UE 115 based on determining which sequences were generated by a subset of indices of the orthogonal matrix 500 and a subset of indices of the base sequences 501.

For example, the UE 115 or the base station 105, or both, may determine a first subset of indices n=0, 2, 4, 6, 8, 10, 12 of the orthogonal matrix 500 and a second subset of indices n=1, 3, 5, 7, 9, 11, 13 (e.g., where N=14) of the orthogonal matrix 500 and may determine a first subset of indices m=0, 2, 4, 6, 8, 10 of the base sequences 501 and a second subset of indices m=1, 3, 5, 7, 9, 11 (e.g., where M=12). The UE 115 or the base station 105, or both, may determine a first sequence pool based on determining which sequences were generated using the first subset of indices of the orthogonal matrix 500 and the first subset of indices of the base sequences 501, a second sequence pool based on determining which sequences were generated using the first subset of indices of the orthogonal matrix 500 and the second subset of indices of the base sequences 501, a third sequence pool based on determining which sequences were generated using the second subset of indices of the orthogonal matrix 500 and the first subset of indices of the base sequences 501, or a fourth sequence pool based on determining which sequences were generated using the second subset of indices of the orthogonal matrix 500 and the second subset of indices of the base sequences 501.

In another example, the UE 115 or the base station 105, or both, may determine the sequence pool associated with the UE 115 based on identifying a continuous block of sequences from the generated set of sequences, as illustrated by FIG. 3, or by identifying a quantity of sequences from the generated set of sequences that are interleaved with one another, as illustrated by FIG. 4. In examples in which the sequences of the sequence pool associated with the UE 115 are interleaved with one another, the base station 105 may signal an interleaving granularity value L that the UE 115-a or the base station 105-a, or both, may use to determine which sequences are in the sequence pool associated with the UE 115.

Based on using a Kronecker product of the orthogonal matrix 500 and the base sequence 501 (e.g., to either generate the sequence pool or to generate the set of sequences), the signal transmitted on each OFDM symbol may have the same PAPR as the base sequence 501, which may improve the coverage area of the UE 115 because the UE 115 may drive a power amplifier to a set power ratio and use a maximum transmit power of the UE 115 to transmit the signal. The generation of an individual orthogonal sequence using a Kronecker product is described in more detail with reference to FIG. 5B.

Figure 5B:
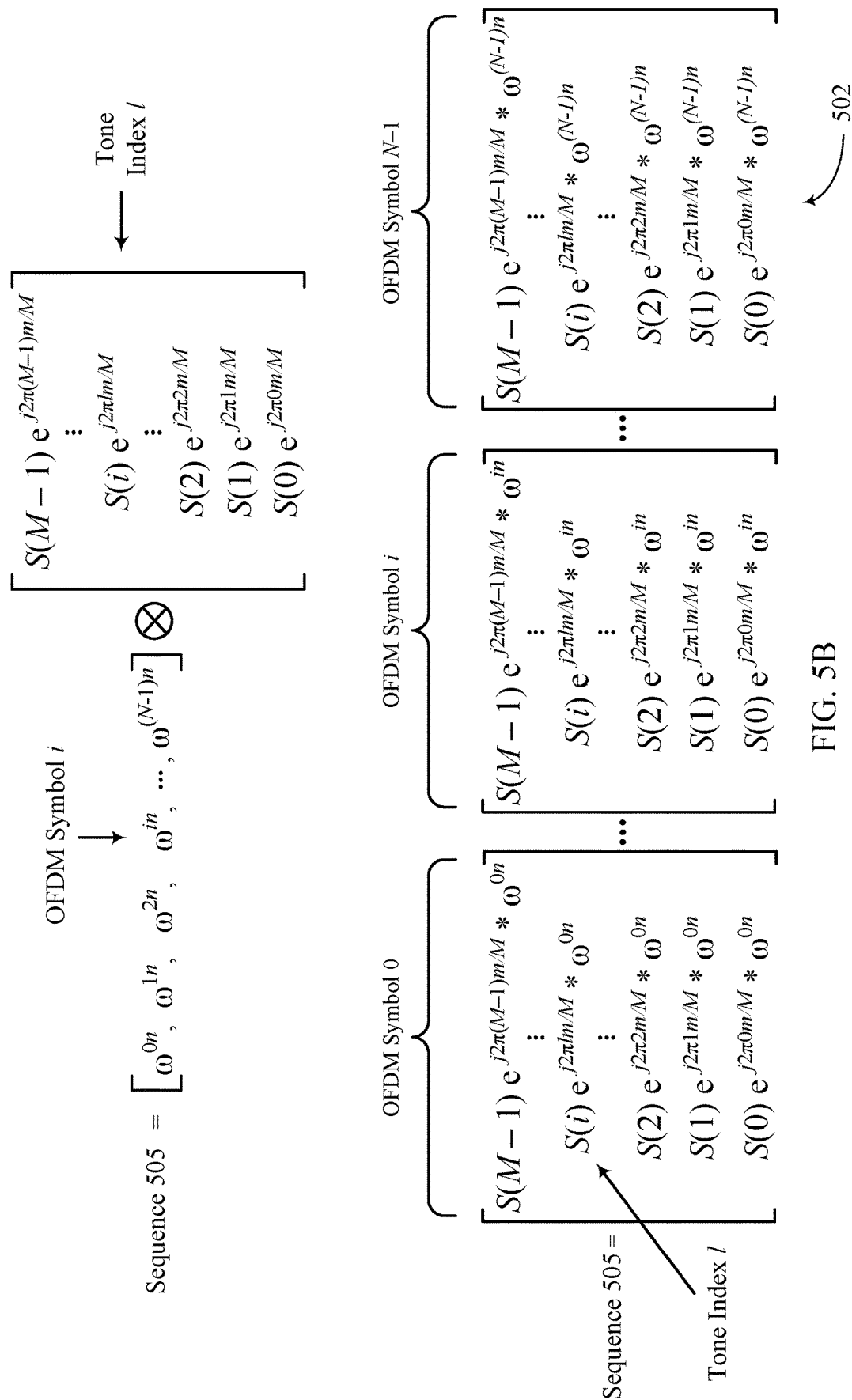
FIG. 5B illustrates an example of a mathematical operation that supports sequence partitioning for a multi-user uplink channel in accordance with aspects of the present disclosure.

FIG. 5B illustrates an example of a mathematical operation 502 that supports sequence partitioning for a multi-user uplink channel in accordance with aspects of the present disclosure. In some examples, the mathematical operation 502 may be implemented to realize aspects of the wireless communications system 100 or the wireless communications system 200. For example, the mathematical operation 502 may be implemented, in some examples of the present disclosure, to determine sequences 505 of a sequence pool associated with a UE 115. The mathematical operation 502 may be an example of a Kronecker product of a row or a column (e.g., a vector) of the orthogonal matrix 500 and a base sequence 501. In some examples, a UE 115 or a base station 105, or both, which may be examples of corresponding devices as described herein, may perform the mathematical operation 502 to determine an orthogonal sequence 505 (e.g., a sequence that is orthogonal in time and frequency).

The UE 115 or the base station 105, or both, may determine the sequence 505 when generating the set of orthogonal sequences (e.g., the N*M orthogonal sequences) or when generating the sequence pool associated with the UE 115, as described in more detail with reference to FIG. 5A. For example, the mathematical operation 502 may illustrate a step or an operation of the generation of the set of sequences and, as such, the mathematical operation 502 may be similarly performed for each unique pair of row or column index n of the orthogonal matrix 500 and cyclic shift index m of the base sequence 501 (in examples in which the UE 115 or the base station 105, or both, generate the full set of sequences) or may be similarly performed for each unique pair of an index of a subset of indices of the orthogonal matrix 500 and an index of a subset of indices of the base sequences 501 (in examples in which the UE 115 or the base station 105, or both, generate the sequence pool associated with the UE 115). For instance, the UE 115 or the base station 105, or both, may perform the mathematical operation 502 N*M times (e.g., to generate N*M orthogonal sequences 505) or a quantity of times equal to the product of the quantity of the subset of indices of the orthogonal matrix 500 and the quantity of the subset of indices of the base sequences 501.

The UE 115 or the base station 105, or both, may determine a row or a column index n of the orthogonal matrix 500 from the N−1 row or column indices or the subset of the row or column indices of the orthogonal matrix 500 and a cyclic shift index m of the base sequence 501 from the M−1 cyclic shift indices or the subset of cyclic shift indices of the base sequence 501. In other words, the UE 115 or the base station 105, or both, may determine the vector corresponding to the row or the column index n of the orthogonal matrix 500, which may be referred to as $\overrightarrow{DFT}(n)$ and be defined by Equation 1, and the vector corresponding to the cyclic shift index m of base sequence 501, which may be illustrated by base sequence $\vec{s}(m)$ (e.g., base sequence 501 may illustrate $\vec{s}$ (cyclic index=m)).

The UE 115 or the base station 105, or both, may determine the Kronecker product of $\overrightarrow{DFT}(n)$ and $\vec{s}(m)$ to determine the sequence 505. The Kronecker product is defined such that the base sequence $\vec{s}(m)$ is multiplied by each column of $\overrightarrow{DFT}(n)$ if $\overrightarrow{DFT}(n)$ is a row vector or by each row of $\overrightarrow{DFT}(n)$ if $\overrightarrow{DFT}(n)$ is a column vector. The $\overrightarrow{DFT}(n)$ may be the full $\overrightarrow{DFT}(n)$ (e.g., including all rows or columns) or a reduced-size $\overrightarrow{DFT}(n)$ (e.g., including a subset of the rows or columns). The Kronecker product of $\overrightarrow{DFT}(n)$ and $\vec{s}(m)$ may be defined by Equation 2, shown below and in expanded form in FIG. 5B.

$$\overrightarrow{DFT}(n) \otimes \vec{s}(m) = [\omega^{0n*}\vec{s}(m), \omega^{1n*}\vec{s}(n), \omega^{2n*}\vec{s}(n), \ldots \omega^{in*}\vec{s}(m), \ldots, \omega^{(N-1)n*}\vec{s}(m)] \quad (2)$$

In some implementations, such as when $\overrightarrow{DFT}(n)$ and $\vec{s}(m)$ are either both row vectors or both column vectors, Equation 2 may generate a (N*M)×1 sequence 505 (in the case that $\overrightarrow{DFT}(n)$ and $\vec{s}(m)$ are column vectors) or an 1×(N*M) sequence 505 (in the case that $\overrightarrow{DFT}(n)$ and $\vec{s}(m)$ are row vectors). Alternatively, in some other implementations, $\overrightarrow{DFT}(n)$ may be a row vector and $\vec{s}(m)$ may be a column vector. In such implementations, Equation 2 may generate an orthogonal sequence of dimensions N×M. In such implementations, the UE 115 or the base station 105, or both, may concatenate each column below the lowest entry of the previous column to effectively generate a (N*M)×1 sequence 505. The UE 115 or the base station 105, or both, may perform such concatenation so that the sequence 505 is represented as a column (or a row) and may be indexed in a codebook. In either implementation, each entry in the sequence 505 may be associated with a unique (i, l) pair, where i may correspond to an OFDM symbol index of the N OFDM symbols of the resource allocation and l may correspond to a frequency tone index of the M frequency tones in the resource allocation. Accordingly, regardless of the specific implementation, the UE 115 or the base station 105 may map the generated sequence 505 to the allocated resource grid such that an entry of the sequence 505 corresponding to a unique (i, l) pair maps to a resource element of the resource grid associated with the (i, l) pair (e.g., the resource element at the $i^{th}$ OFDM symbol and the $l^{th}$ frequency tone of the resource grid).

In some examples, an OFDM symbol index i=0 may correspond to the first OFDM symbol (e.g., the temporally earliest) of the resource allocation and a frequency tone index i=0 may correspond to the lowest frequency tone (e.g., the lowest frequency subcarrier) of the resource allocation. Likewise, an OFDM symbol index i=N−1 may correspond to the last (e.g., the temporally latest) OFDM symbol of the resource allocation and a frequency tone index i=M−1 may correspond to the highest frequency tone (e.g., the highest frequency subcarrier) of the resource allocation.

Such generation of a set of sequences 505 (e.g., either a full set of sequences 505 or sequences 505 in a sequence pool associated with the UE 115) may correspond to a spreading of the base sequence 501 in the time-domain (e.g., based on a CDMA concept) via the orthogonal matrix 500 (e.g., using a DFT vector in the time-domain) and a phase ramping in the frequency-domain based on the cyclic shift index of the base sequence 501. As described with reference to FIG. 5A, the phase ramping in the frequency-domain may correspond to (e.g., be equivalent to) a cyclic shift in the time-domain. In the case that the orthogonal matrix is a DFT matrix, the described techniques may also correspond to a DFT-based orthogonal cover code and cyclic shift-based multiplexing representation of the payload for a single user. Further, the implementations of the present disclosure may correspond to an index modulation scheme using N DFT dimensions and M cyclic shift dimensions to carry a quantity of bits based on the N and M dimensions. For instance, such an index modulation scheme may carry the payload based on an on-off pattern on the N*M tones of the sequence 505. When using index modulation, the UE 115 may convey different information by using different on-off patterns on the N*M tones of the sequence 505. In some examples, the described techniques may be implemented to carry $\log_2$ (N*M) bits based on having N DFT dimensions and M cyclic shift dimensions (e.g., a sequence 505 of length N*M generated by the orthogonal matrix 500 and the base sequence 501 may carry $\log_2$ (N*M) bits).

As such, the UE 115 or the base station 105, or both, may generate the sequence 505 that may convey a payload across the resources allocated for the transmission of the payload. The UE 115 or the base station 105, or both, may repeat the mathematical operation 502 for each unique pair of row or column index n of the orthogonal matrix 500 or of the subset of row or column indices of the orthogonal matrix 500 and each cyclic shift index m of the base sequence 501 or of the subset of cyclic shift indices of the base sequence 501 (i.e., each unique (n, m) pair) to generate the set of full set sequences 505 or the sequences 505 in the sequence pool associated with the UE 115, where each sequence 505 may convey the payload across each resource element in the resource grid defined by N OFDM symbols and M frequency tones. In some implementations, the UE 115 or the base station 105, or both, may construct a codebook of a subset sequences 505 from the sequence pool associated with the UE 115 based on the quantity of bits in the payload. The selection of the subset of sequences 505 is described in further detail with reference to FIG. 2.

Figure 6:
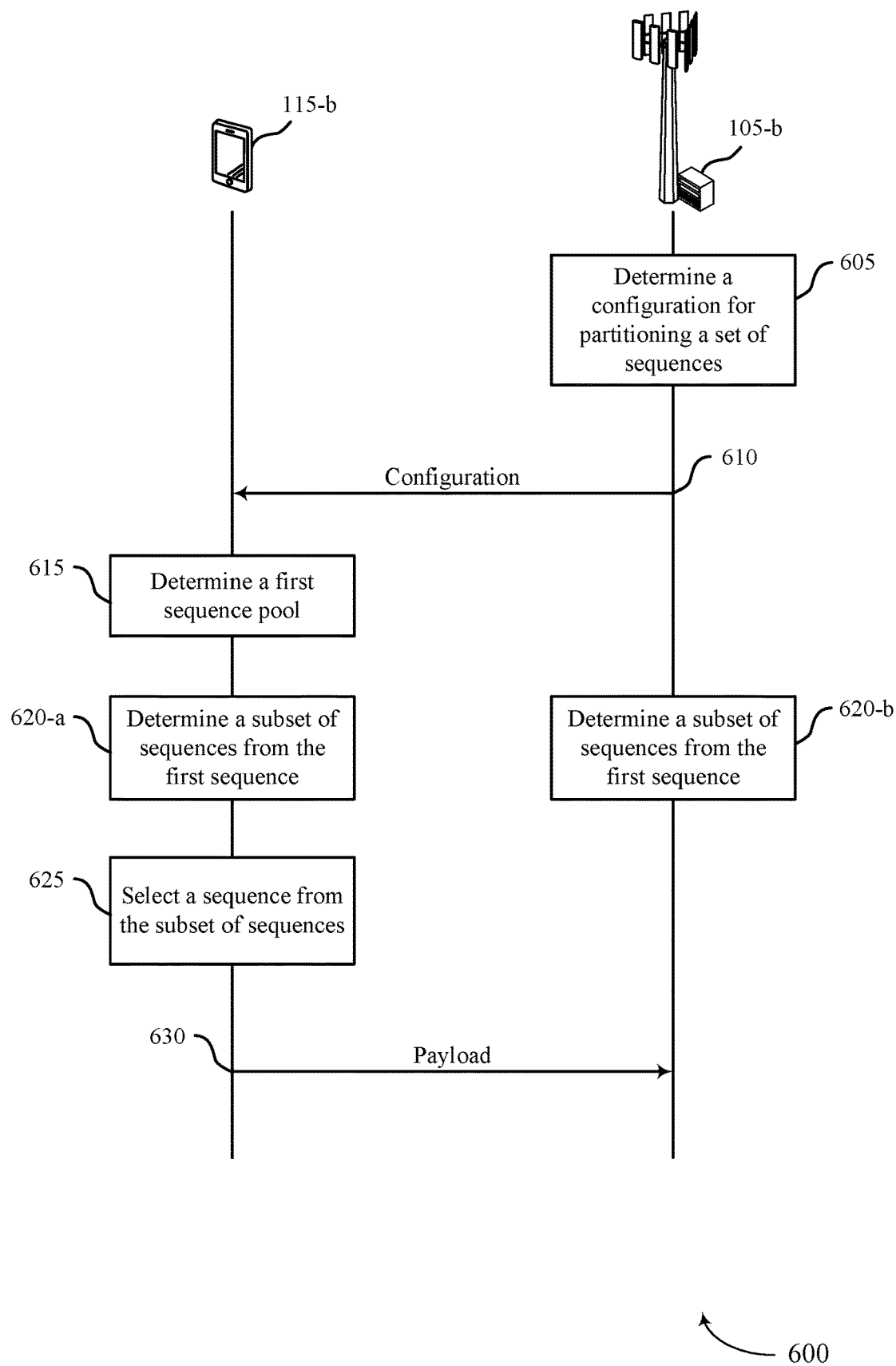
FIG. 6 illustrates an example of a process flow that supports sequence partitioning for a multi-user uplink channel in accordance with aspects of the present disclosure.

FIG. 6 illustrates an example of a process flow 600 that supports sequence partitioning for a multi-user uplink channel in accordance with aspects of the present disclosure. In some examples, the process flow 600 may implement aspects of wireless communications system 100 or the wireless communications system 200. The process flow 600 may illustrate communication between a UE 115-b and a base station 105-b, which may be examples of corresponding devices as described herein. The UE 115-b or the base station 105-b, or both, may determine a sequence pool associated with the UE 115-b based on a configuration for partitioning a set of sequences and may determine a subset of sequences from the sequence pool. Further, the UE 115-b may select a sequence from the subset of sequences and may transmit a payload to the base station 105-b using the selected sequence. Alternative examples of the following may be implemented, where some steps are performed in a different order than described or are not performed at all. In some cases, steps may include additional features not mentioned below, or further steps may be added.

At 605, the base station 105-b may determine a configuration for partitioning a set of sequences into a set of sequence pools associated with a set of UEs 115-b. For example, multiple UEs 115-b may share a resource allocation for transmitting a payload (e.g., a sequence-based transmission) to the base station 105-b and the base station 105-b may configure the set of sequences such that each of the multiple UEs 115-b have their own sequence pool from which to select a sequence to use to transmit a payload. In some examples, the resource allocation may be a PUCCH and, as such, the base station 105-b and the multiple UEs 115-b may support a multi-user design for sequence-based transmissions over a PUCCH. The sequences may be orthogonal sequences or non-orthogonal sequences and may have a length based on the quantity of time periods (e.g., OFDM symbol periods) and a quantity of frequency tones (e.g., subcarriers) of the resource allocation.

At 610, the base station 105-b may transmit the configuration for partitioning the set of sequences to the UE 115-b. In some examples, the base station 105-b may additionally transmit the configuration for partitioning the set of sequences to other UEs 115-b that may use the same resource allocation as the UE 115-b to transmit a payload to the base station 105-b.

At 615, the UE 115-a may determine a first sequence pool associated with the UE 115-b based on the configuration for partitioning the set of sequences. In some examples, determining the first sequence pool associated with the UE 115-b may include generating the first sequence pool based on an initial seed. In such examples, the base station 105-b may transmit an indication of a UE ID to the UE 115-b and the UE 115-b may determine the initial seed based on the UE ID, a slot ID, a frame ID, or any combination thereof. In some other examples, determining the first sequence pool associated with the UE 115-b may include identifying a subset of indices (e.g., first subset of indices) of an orthogonal matrix and a subset of indices (e.g., a second subset of indices) of a base sequence and generating the first sequence pool based on a product of the subset of indices of the orthogonal matrix and the subset of indices of the base sequence. In other words, the UE 115-b may generate the first sequence pool based on a product of a subset of the rows or columns of the orthogonal matrix and a subset of the cyclic shifts of the base sequence. In some other examples, determining the first sequence associated with the UE 115-*b* may include generating the set of sequences based on a product of the orthogonal matrix (e.g., the full orthogonal matrix) and the base sequence (e.g., all cyclic shifts of the base sequence) and selecting sequences from the generated set of sequences. Additional details relating to determining the first sequence pool associated with the UE 115-*b* are described herein, including with reference to FIGS. 3 through 5.

At 620-*a* and 620-*b*, the UE 115-*b* and the base station 105-*b* may determine a subset of sequences from the first sequence pool for conveying a payload. In some examples, the size (e.g., the quantity) of the subset of sequences is based at least in part on the quantity of the set of bits of the payload. For example, the payload may include K bits and, as such, the UE 115-*b* and the base station 105-*b* may determine a subset of sequences equal to $2^K$ sequences. The UE 115-*b* or the base station 105-*b*, or both, may include the subset of sequences in a constructed codebook and may index the subset of sequences in the codebook.

At 625, the UE 115-*b* may select a sequence from the subset of sequences (e.g., from the constructed codebook) based on a mapping between the subset of sequences and the quantity of bits in the payload. In some examples, the UE 115-*b* may identify a bit stream of the payload and convert the bit stream into a decimal number corresponding to an index in the constructed codebook including the subset of sequences, where each sequence in the subset of sequences is associated with an index in the codebook. Accordingly, the UE 115-*b* may select the sequence that is associated with an index corresponding to the determined decimal number.

At 630, the UE 115-*b* may transmit the payload including the quantity of bits using the selected sequence. Likewise, the base station 105-*b* may receive the payload including the quantity of bits using the selected sequence from the subset of sequences. In some implementations, the base station 105-*b* may additionally receive other payloads from other UEs 115-*b* using a selected sequence from sequence pools associated with the other UEs 115-*b*. For example, the base station 105-*b* may receive, from a second UE 115-*b*, a second payload including a second quantity of bits using a second selected sequence from a second subset of sequences of a second sequence pool associated with the second UE 115-*b*. In some examples, the UE 115-*b* may transmit the payload on an uplink channel, such as a PUCCH. In such examples, the payload may be an example of uplink control information.

Although described in the context of uplink communication from the UE 115-*b* to the base station 105-*b*, the described techniques may be equally applicable to communication from the base station 105-*b* to the UE 115-*b*. For example, the base station 105-*b* may transmit the payload to the UE 115-*b* on a downlink channel. Alternatively, the described techniques may be applied to communication between two UEs 115-*b* or two base stations 105-*b* and, in such examples, either device may transmit the payload to the other on a sidelink channel or via a wireless backhaul connection.

Figure 7:
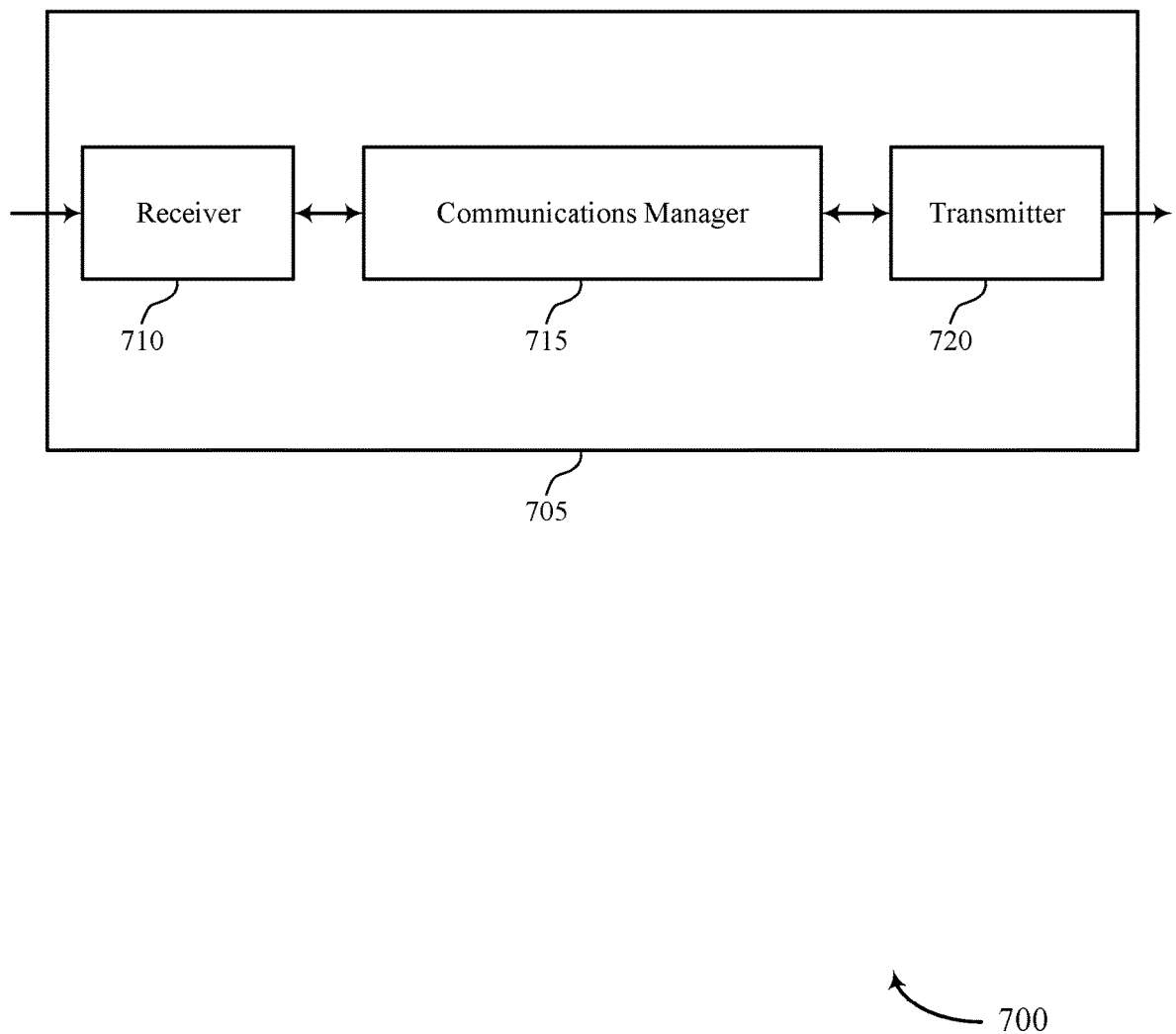
FIGS. 7 and 8 illustrate block diagrams of devices that support sequence partitioning for a multi-user uplink channel in accordance with aspects of the present disclosure.

FIG. 7 illustrates a block diagram 700 of a device 705 that supports sequence partitioning for a multi-user uplink channel in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to sequence partitioning for a multi-user uplink channel, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a configuration for partitioning a set of sequences into a set of sequence pools associated with a set of UEs, determine a subset of sequences from a first sequence pool of the set of sequence pools for conveying a payload based on the configuration, where a size of the subset of sequences is based on a quantity of a set of bits of the payload, select a sequence from the subset of sequences based on a mapping between the subset of sequences and the set of bits, and transmit the payload including the set of bits using the selected sequence. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and the transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. In some implementations of the present disclosure, the communications manager 715 may construct a codebook of a subset of sequences from a sequence pool associated with the device 705. In some implementations, the communications manager 715 may generate a codebook of orthogonal sequences (e.g., sequences that are orthogonal in the time-domain and the frequency-domain). The orthogonal sequences may maintain the low PAPR of the cell-specific base sequence, which may enable the device 705 to transmit a greater power and, likewise, improve its coverage area.

Moreover, based on constructing a codebook of a subset of sequences from the sequence pool associated with the device 705, the device 705 may avoid unnecessary storage costs associated with storing more sequences than necessary for the transmission of a K-sized payload and may also enable other UEs 115 to use some of a set of sequences from which the sequence pool associated with the device 705 was determined. In some specific implementations, the use of an orthogonal sequence to convey a payload to a base station may reduce latency and increase reliability as compared to non-orthogonal sequences, which may increase the likelihood for successful communications between the device 705 and the base station. As such, one or more processing units of the device 705 may potentially spend less time re-transmitting a payload and, accordingly, may spend longer durations in a sleep mode. As such, the device 705 may experience improved power savings and increased battery life.

Figure 8:
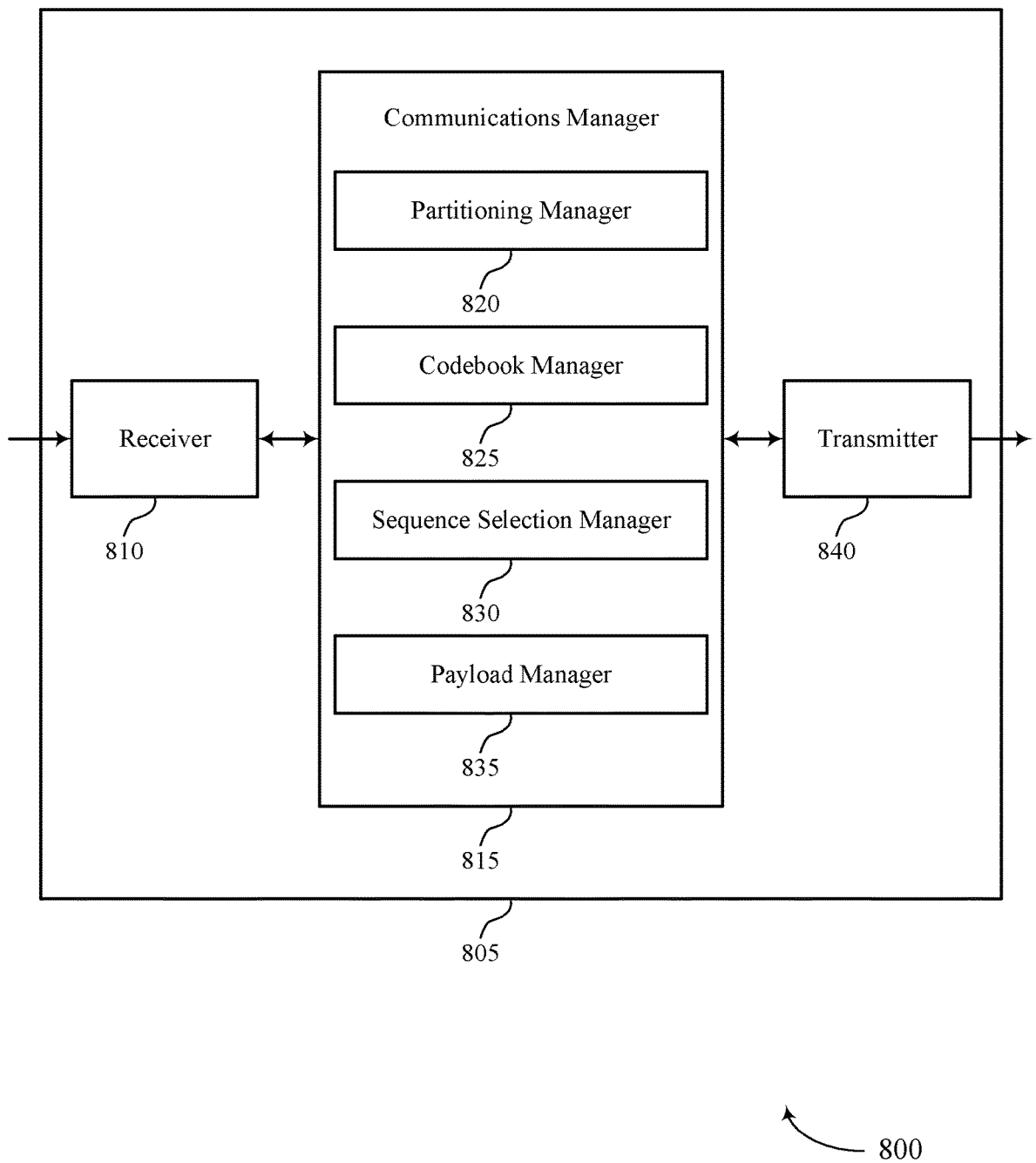

FIG. 8 illustrates a block diagram 800 of a device 805 that supports sequence partitioning for a multi-user uplink channel in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to sequence partitioning for a multi-user uplink channel, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a partitioning manager 820, a codebook manager 825, a sequence selection manager 830, and a payload manager 835. The communications manager 815 may be an example of aspects of the communications manager 1010 described herein.

The partitioning manager 820 may receive a configuration for partitioning a set of sequences into a set of sequence pools associated with a set of UEs. The codebook manager 825 may determine a subset of sequences from a first sequence pool of the set of sequence pools for conveying a payload based on the configuration, where a size of the subset of sequences is based on a quantity of a set of bits of the payload. The sequence selection manager 830 may select a sequence from the subset of sequences based on a mapping between the subset of sequences and the set of bits. The payload manager 835 may transmit the payload including the set of bits using the selected sequence.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
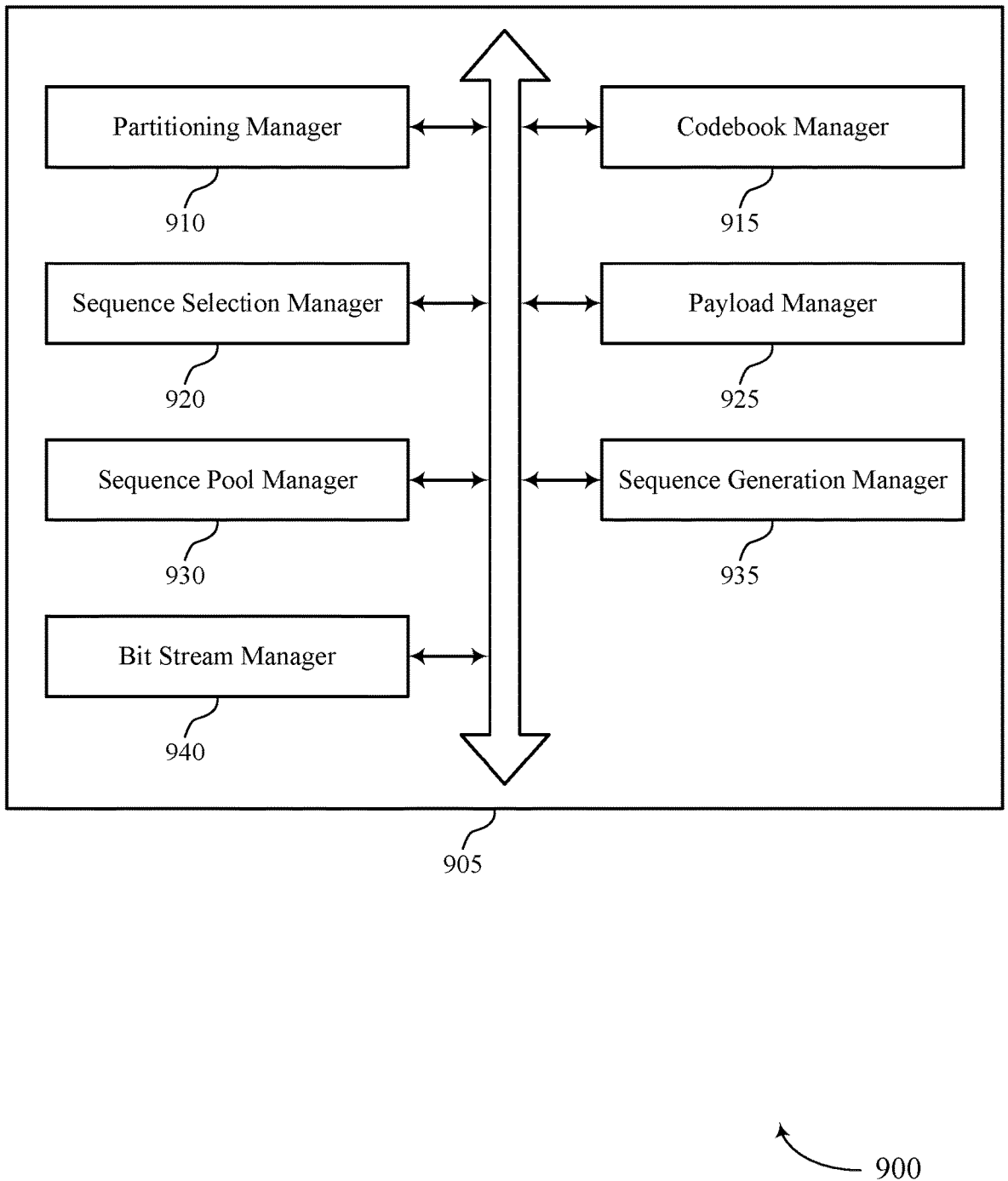
FIG. 9 illustrates a block diagram of a communications manager that supports sequence partitioning for a multi-user uplink channel in accordance with aspects of the present disclosure.

FIG. 9 illustrates a block diagram 900 of a communications manager 905 that supports sequence partitioning for a multi-user uplink channel in accordance with aspects of the present disclosure. The communications manager 905 may be an example of aspects of a communications manager 715, a communications manager 815, or a communications manager 1010 described herein. The communications manager 905 may include a partitioning manager 910, a codebook manager 915, a sequence selection manager 920, a payload manager 925, a sequence pool manager 930, a sequence generation manager 935, and a bit stream manager 940. Each of these modules may communicate, directly or indirectly, with one another (e.g., via one or more buses).

The partitioning manager 910 may receive a configuration for partitioning a set of sequences into a set of sequence pools associated with a set of UEs. In some examples, the partitioning manager 910 may identify, based on the configuration, a first subset of indices of an orthogonal matrix and a second subset of indices of a cyclically shifted cell-specific sequence.

In some cases, the first subset of indices of the orthogonal matrix and the second subset of indices of the cyclically shifted cell-specific sequence include continuous indices, interleaved indices, or any combination thereof. In some cases, the orthogonal matrix is a DFT matrix.

The codebook manager 915 may determine a subset of sequences from a first sequence pool of the set of sequence pools for conveying a payload based on the configuration, where a size of the subset of sequences is based on a quantity of a set of bits of the payload. In some cases, the subset of sequences includes a codebook for conveying the payload including the set of bits.

The sequence selection manager 920 may select a sequence from the subset of sequences based on a mapping between the subset of sequences and the set of bits.

The payload manager 925 may transmit the payload including the set of bits using the selected sequence.

The sequence pool manager 930 may determine the first sequence pool based on the configuration, where the first sequence pool is associated with the UE. In some examples, the sequence pool manager 930 may determine a pool of continuous sequences of the set of sequences. In some examples, the sequence pool manager 930 may receive an interleaving value, where the determining of the first sequence pool is based on the interleaving value.

In some examples, the sequence pool manager 930 may determine a first quantity of sequences corresponding to the interleaving value. In some examples, the sequence pool manager 930 may determine a second quantity of sequences corresponding to the interleaving value a distance from the first quantity of sequences based on a quantity of the set of UEs and the interleaving value. In some examples, the sequence pool manager 930 may determine an initial seed based on a UE ID, a slot ID, a frame ID, or any combination thereof. In some examples, the sequence pool manager 930 may generate the first sequence pool based on the initial seed.

In some examples, the sequence pool manager 930 may receive an indication of the UE ID. In some examples, the sequence pool manager 930 may generate the first sequence pool based on a product of the first subset of indices of the orthogonal matrix and the second subset of indices of the cyclically shifted cell-specific sequence.

In some examples, the sequence pool manager 930 may determine the first sequence pool from the set of sequences based on the first subset of indices of the orthogonal matrix and the second subset of indices of the cyclically shifted cell-specific sequence. In some cases, the first sequence pool is generated based on a pseudo-random random number generator. In some cases, the first sequence pool is generated based on a maximum length sequence. In some cases, the first sequence pool is generated based on a Gold sequence.

The sequence generation manager 935 may generate the set of sequences based on a product of an orthogonal matrix having a size corresponding to a quantity of time periods and a cyclically shifted cell-specific sequence having a length corresponding to a quantity of frequency tones, where the quantity of time periods and the quantity of frequency tones include a resource allocation for conveying the payload. In some cases, the orthogonal matrix is a DFT matrix. In some cases, each sequence of the plurality of sequences is a sequence of numbers.

The bit stream manager 940 may convert the set of bits into a decimal number, where the mapping between the subset of sequences and the set of bits is based on a mapping between the decimal number and an index of the subset of sequences.

Figure 10:
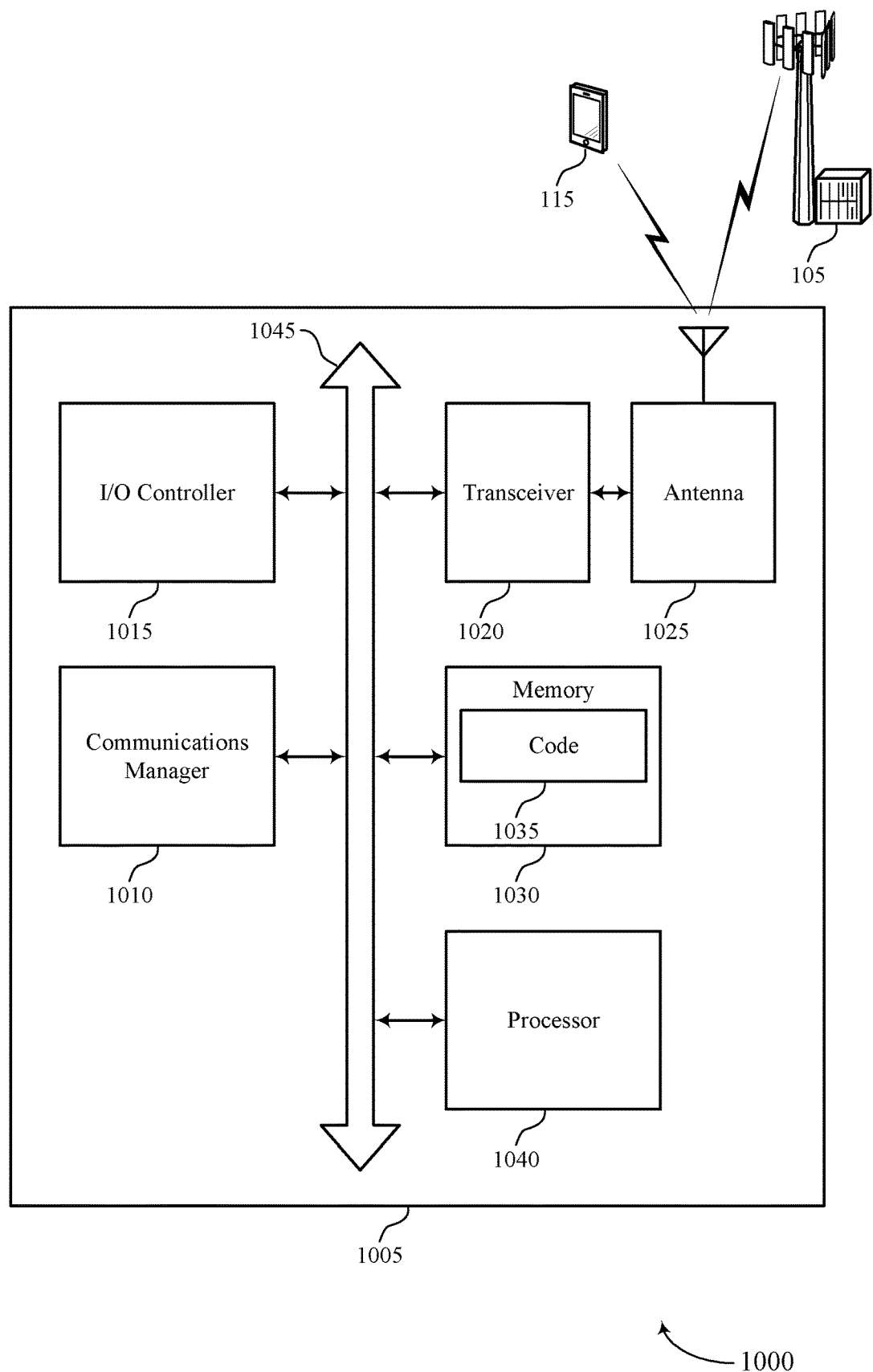
FIG. 10 illustrates a diagram of a system including a device that supports sequence partitioning for a multi-user uplink channel in accordance with aspects of the present disclosure.

FIG. 10 illustrates a diagram of a system 1000 including a device 1005 that supports sequence partitioning for a multi-user uplink channel in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be coupled (e.g., in electronic communication) via one or more buses (e.g., bus 1045).

The communications manager 1010 may receive a configuration for partitioning a set of sequences into a set of sequence pools associated with a set of UEs, determine a subset of sequences from a first sequence pool of the set of sequence pools for conveying a payload based on the configuration, where a size of the subset of sequences is based on a quantity of a set of bits of the payload, select a sequence from the subset of sequences based on a mapping between the subset of sequences and the set of bits, and transmit the payload including the set of bits using the selected sequence.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sequence partitioning for a multi-user uplink channel).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
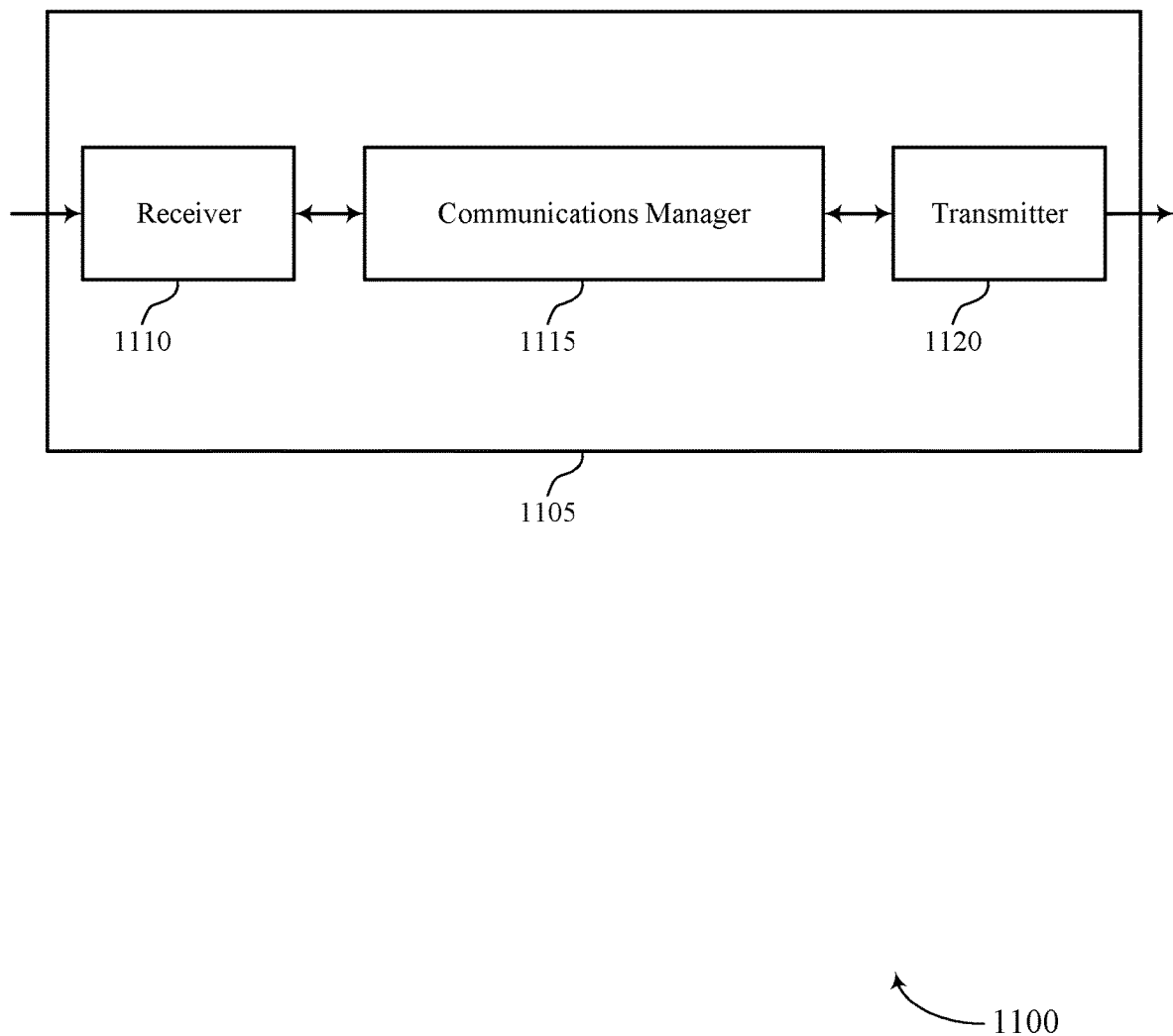
FIGS. 11 and 12 illustrate block diagrams of devices that support sequence partitioning for a multi-user uplink channel in accordance with aspects of the present disclosure.

FIG. 11 illustrates a block diagram 1100 of a device 1105 that supports sequence partitioning for a multi-user uplink channel in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to sequence partitioning for a multi-user uplink channel, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a configuration for partitioning a set of sequences into a set of sequence pools associated with a set of UEs, transmit the configuration for partitioning the set of sequences, determine a subset of sequences from a first sequence pool of the set of sequence pools for conveying a payload based on the configuration, where a size of the subset of sequences is based on a quantity of a set of bits of the payload, and receive the payload including the set of bits using a selected sequence from the subset of sequences, the selected sequence based on a mapping between the subset of sequences and the set of bits. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

As described herein, the device 1105 may determine a configuration for partitioning a set of sequences into multiple sequence pools, each sequence pool associated with (e.g., usable by) a different UE 115. As such, multiple UEs 115 may select sequences from the set of sequences without the possibility of selecting the same sequence (e.g., based on selecting sequences from different, non-overlapping sequence pools). Accordingly, the multiple UEs 115 may transmit a payload using a selected sequence from the set of sequences to the device 1105 over a single resource allocation, which may result in greater resource efficiency and a greater achievable throughput of the system. Further, based on enabling multiple UEs 115 to select a sequence from different sequence pools from the same set of sequences, the device 1105 may transmit less control signaling to the multiple UEs 115, which may reduce signaling overhead and improve spectral efficiency.

Figure 12:
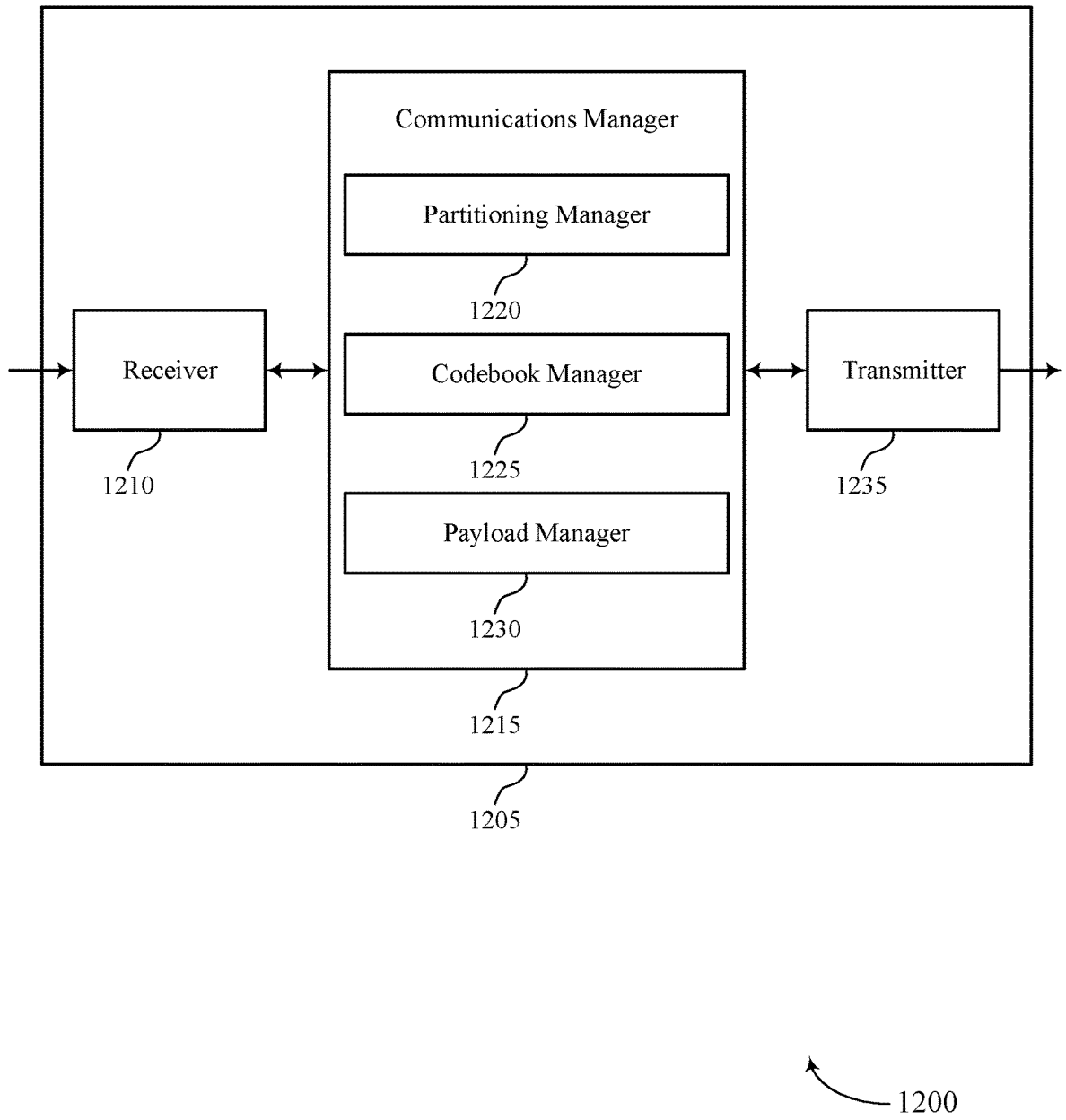

FIG. 12 illustrates a block diagram 1200 of a device 1205 that supports sequence partitioning for a multi-user uplink channel in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to sequence partitioning for a multi-user uplink channel, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a partitioning manager 1220, a codebook manager 1225, and a payload manager 1230. The communications manager 1215 may be an example of aspects of the communications manager 1410 described herein.

The partitioning manager 1220 may determine a configuration for partitioning a set of sequences into a set of sequence pools associated with a set of UEs and transmit the configuration for partitioning the set of sequences. The codebook manager 1225 may determine a subset of sequences from a first sequence pool of the set of sequence pools for conveying a payload based on the configuration, where a size of the subset of sequences is based on a quantity of a set of bits of the payload. The payload manager 1230 may receive the payload including the set of bits using a selected sequence from the subset of sequences, the selected sequence based on a mapping between the subset of sequences and the set of bits.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
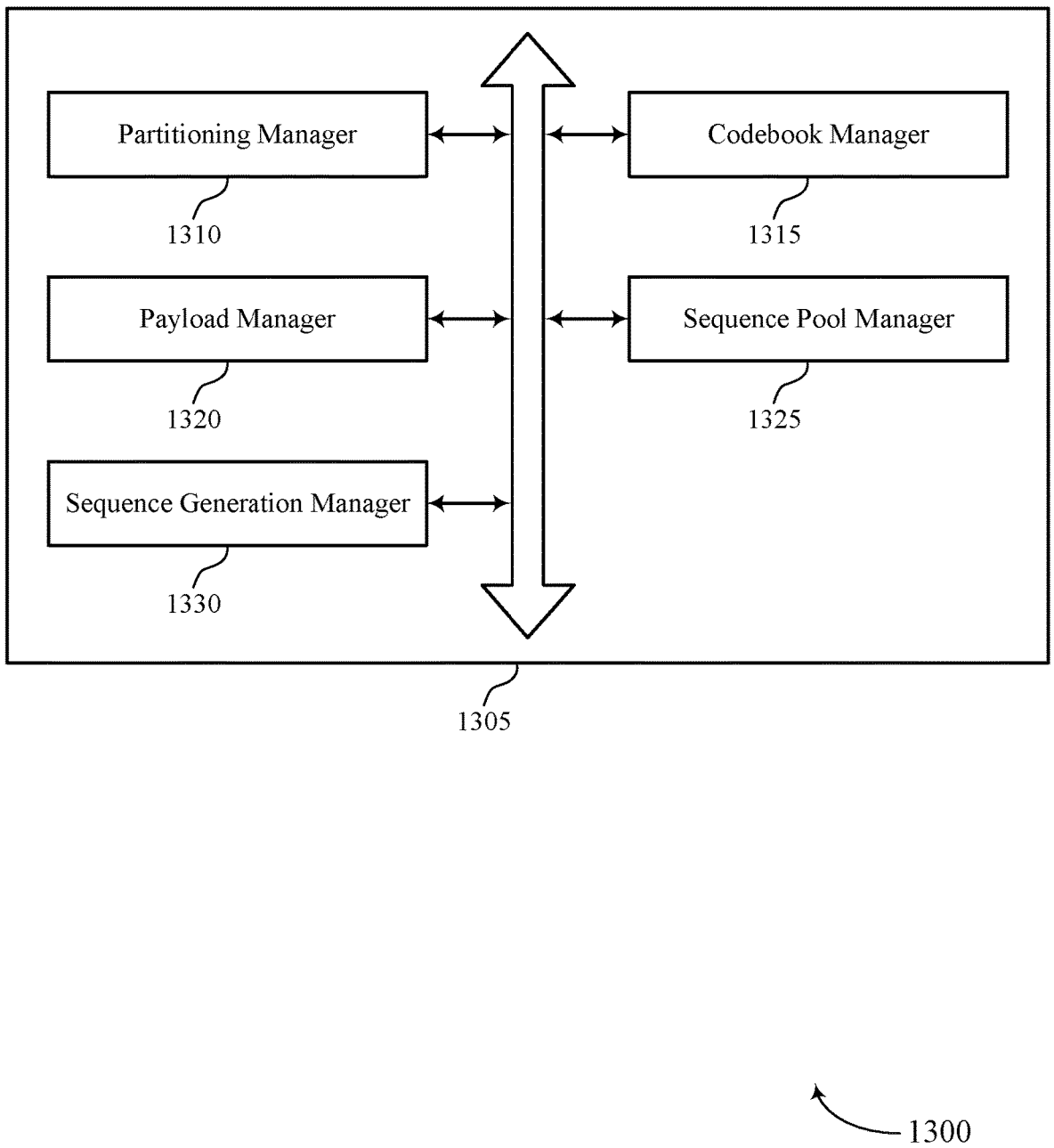
FIG. 13 illustrates a block diagram of a communications manager that supports sequence partitioning for a multi-user uplink channel in accordance with aspects of the present disclosure.

FIG. 13 illustrates a block diagram 1300 of a communications manager 1305 that supports sequence partitioning for a multi-user uplink channel in accordance with aspects of the present disclosure. The communications manager 1305 may be an example of aspects of a communications manager 1115, a communications manager 1215, or a communications manager 1410 described herein. The communications manager 1305 may include a partitioning manager 1310, a codebook manager 1315, a payload manager 1320, a sequence pool manager 1325, and a sequence generation manager 1330. Each of these modules may communicate, directly or indirectly, with one another (e.g., via one or more buses).

The partitioning manager 1310 may determine a configuration for partitioning a set of sequences into a set of sequence pools associated with a set of UEs. In some examples, the partitioning manager 1310 may transmit the configuration for partitioning the set of sequences. In some examples, the partitioning manager 1310 may identify, based on the configuration, a first subset of indices of an orthogonal matrix and a second subset of indices of a cyclically shifted cell-specific sequence.

In some cases, the first subset of indices of the orthogonal matrix and the second subset of indices of the cyclically shifted cell-specific sequence include continuous indices, interleaved indices, or any combination thereof. In some cases, the orthogonal matrix is a DFT matrix.

The codebook manager 1315 may determine a subset of sequences from a first sequence pool of the set of sequence pools for conveying a payload based on the configuration, where a size of the subset of sequences is based on a quantity of a set of bits of the payload. In some examples, the codebook manager 1315 may determine a second subset of sequences from a second sequence pool of the set of sequence pools for conveying a second payload based on the configuration, where a size of the second subset of sequences is based on a second quantity of a second set of bits of the second payload. In some cases, the subset of sequences includes a codebook for conveying the payload including the set of bits.

The payload manager 1320 may receive the payload including the set of bits using a selected sequence from the subset of sequences, the selected sequence based on a mapping between the subset of sequences and the set of bits. In some examples, the payload manager 1320 may receive the second payload including the second set of bits using a second selected sequence from the second subset of sequences, the second selected sequence based on a second mapping between the second subset of sequences and the second set of bits.

The sequence pool manager 1325 may determine the first sequence pool based on the configuration, where the first sequence pool is associated with a first UE. In some examples, the sequence pool manager 1325 may determine a pool of continuous sequences of the set of sequences. In some examples, the sequence pool manager 1325 may determine an interleaving value, where the determining of the first sequence pool is based on the interleaving value.

In some examples, the sequence pool manager 1325 may transmit the interleaving value. In some examples, the sequence pool manager 1325 may determine a first quantity of sequences corresponding to the interleaving value. In some examples, the sequence pool manager 1325 may determine a second quantity of sequences corresponding to the interleaving value a distance from the first quantity of sequences based on a quantity of the set of UEs and the interleaving value.

In some examples, the sequence pool manager 1325 may determine an initial seed based on a UE ID, a slot ID, a frame ID, or any combination thereof. In some examples, the sequence pool manager 1325 may generate the first sequence pool based on the initial seed. In some examples, the sequence pool manager 1325 may transmit an indication of the UE ID. In some examples, the sequence pool manager 1325 may generate the first sequence pool based on a product of the first subset of indices of the orthogonal matrix and the second subset of indices of the cyclically shifted cell-specific sequence.

In some examples, the sequence pool manager 1325 may determine the first sequence pool from the set of sequences based on the first subset of indices of the orthogonal matrix and the second subset of indices of the cyclically shifted cell-specific sequence. In some cases, the first sequence pool is generated based on a pseudo-random random number generator. In some cases, the first sequence pool is generated based on a maximum length sequence. In some cases, the first sequence pool is generated based on a Gold sequence.

The sequence generation manager 1330 may generate the set of sequences based on a product of an orthogonal matrix having a size corresponding to a quantity of time periods and a cyclically shifted cell-specific sequence having a length corresponding to a quantity of frequency tones, where the quantity of time periods and the quantity of frequency tones include a resource allocation for conveying the payload. In some cases, the orthogonal matrix is a DFT matrix. In some cases, each sequence of the plurality of sequences is a sequence of numbers.

Figure 14:
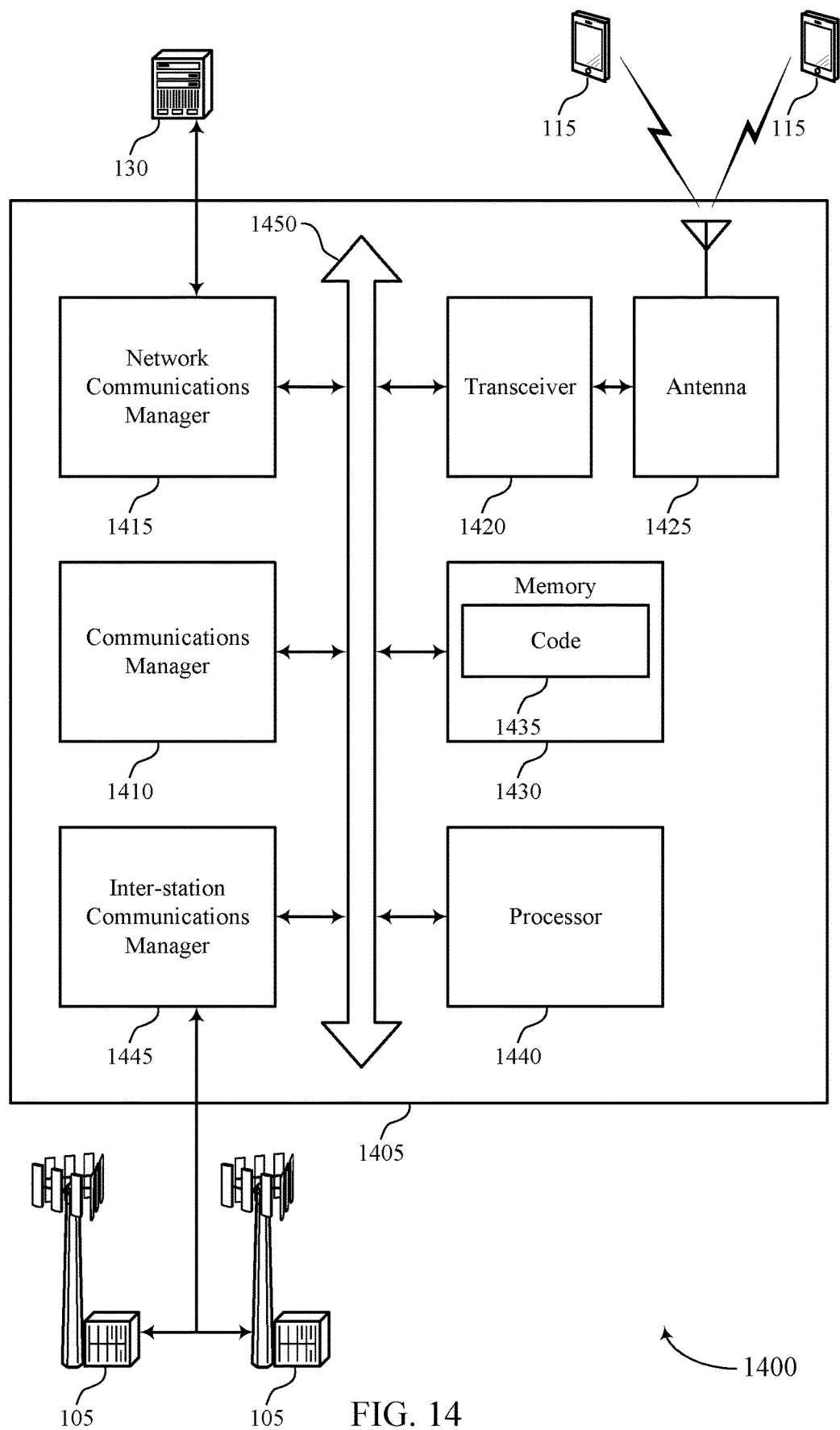
FIG. 14 illustrates a diagram of a system including a device that supports sequence partitioning for a multi-user uplink channel in accordance with aspects of the present disclosure.

FIG. 14 illustrates a diagram of a system 1400 including a device 1405 that supports sequence partitioning for a multi-user uplink channel in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be coupled (e.g., in electronic communication) via one or more buses (e.g., bus 1450).

The communications manager 1410 may determine a configuration for partitioning a set of sequences into a set of sequence pools associated with a set of UEs, transmit the configuration for partitioning the set of sequences, determine a subset of sequences from a first sequence pool of the set of sequence pools for conveying a payload based on the configuration, where a size of the subset of sequences is based on a quantity of a set of bits of the payload, and receive the payload including the set of bits using a selected sequence from the subset of sequences, the selected sequence based on a mapping between the subset of sequences and the set of bits.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting sequence partitioning for a multi-user uplink channel).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
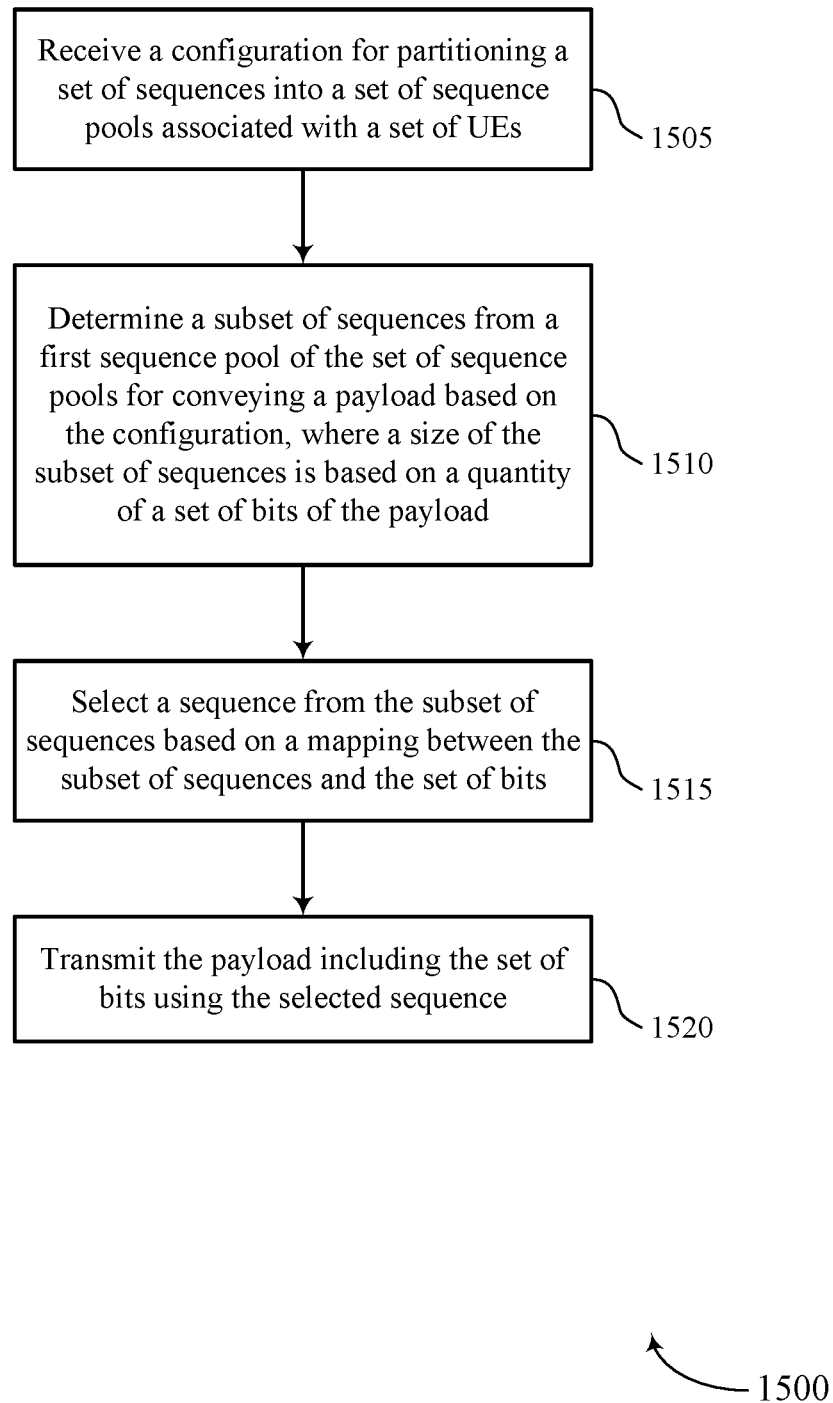
FIGS. 15 through 20 illustrate flowcharts illustrating methods that support sequence partitioning for a multi-user uplink channel in accordance with aspects of the present disclosure.

FIG. 15 illustrates a flowchart illustrating a method 1500 that supports sequence partitioning for a multi-user uplink channel in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive a configuration for partitioning a set of sequences into a set of sequence pools associated with a set of UEs. The operations of 1505 may be performed according to the methods described herein. In some examples, aspects of the operations of 1505 may be performed by a partitioning manager as described with reference to FIGS. 7 through 10.

At 1510, the UE may determine a subset of sequences from a first sequence pool of the set of sequence pools for conveying a payload based on the configuration, where a size of the subset of sequences is based on a quantity of a set of bits of the payload. The operations of 1510 may be performed according to the methods described herein. In some examples, aspects of the operations of 1510 may be performed by a codebook manager as described with reference to FIGS. 7 through 10.

At 1515, the UE may select a sequence from the subset of sequences based on a mapping between the subset of sequences and the set of bits. The operations of 1515 may be performed according to the methods described herein. In some examples, aspects of the operations of 1515 may be performed by a sequence selection manager as described with reference to FIGS. 7 through 10.

At 1520, the UE may transmit the payload including the set of bits using the selected sequence. The operations of 1520 may be performed according to the methods described herein. In some examples, aspects of the operations of 1520 may be performed by a payload manager as described with reference to FIGS. 7 through 10.

Figure 16:
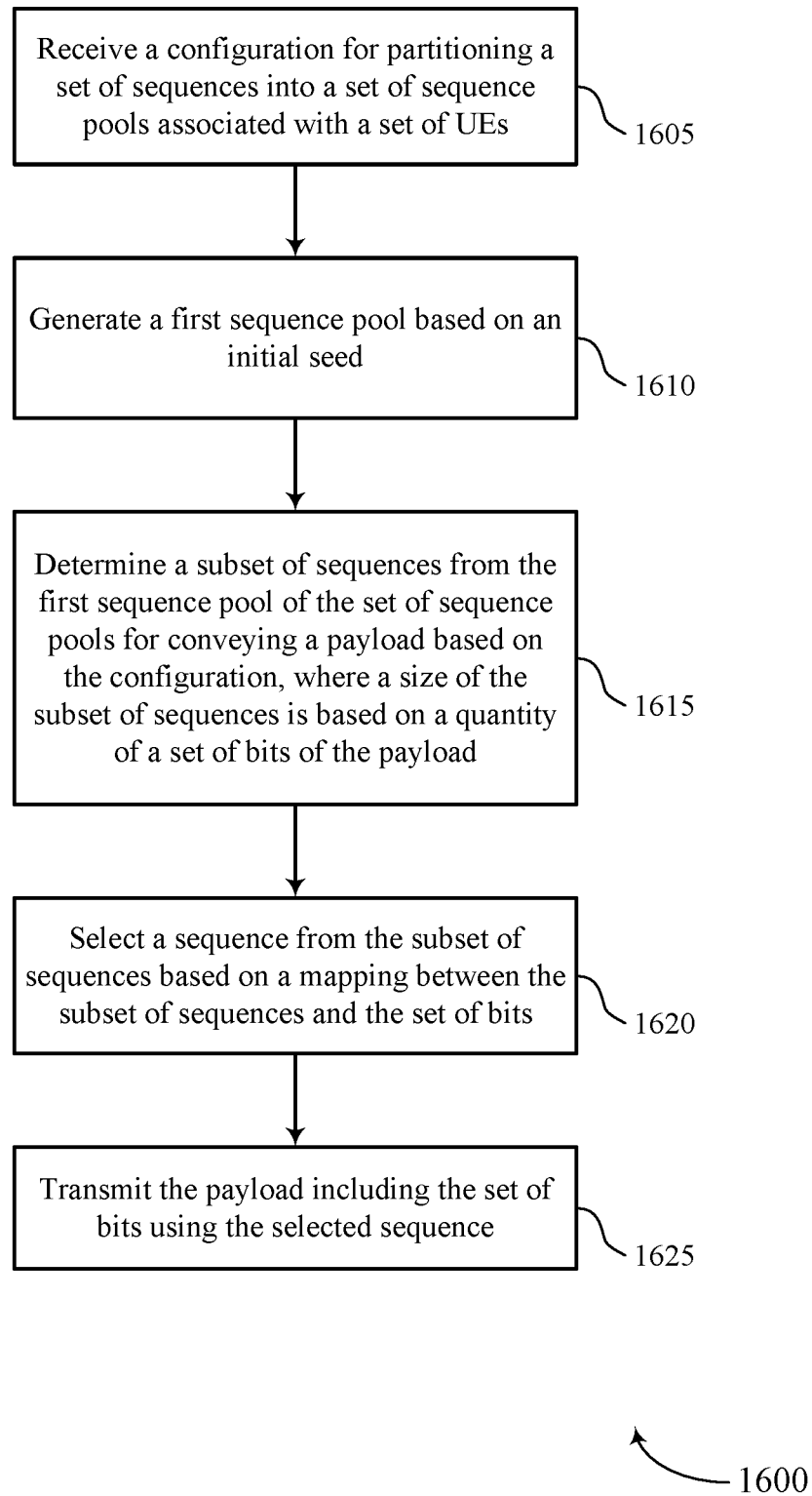

FIG. 16 illustrates a flowchart illustrating a method 1600 that supports sequence partitioning for a multi-user uplink channel in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive a configuration for partitioning a set of sequences into a set of sequence pools associated with a set of UEs. The operations of 1605 may be performed according to the methods described herein. In some examples, aspects of the operations of 1605 may be performed by a partitioning manager as described with reference to FIGS. 7 through 10.

At 1610, the UE may generate a first sequence pool based on an initial seed. The operations of 1610 may be performed according to the methods described herein. In some examples, aspects of the operations of 1610 may be performed by a sequence pool manager as described with reference to FIGS. 7 through 10.

At 1615, the UE may determine a subset of sequences from the first sequence pool of the set of sequence pools for conveying a payload based on the configuration, where a size of the subset of sequences is based on a quantity of a set of bits of the payload. The operations of 1615 may be performed according to the methods described herein. In some examples, aspects of the operations of 1615 may be performed by a codebook manager as described with reference to FIGS. 7 through 10.

At 1620, the UE may select a sequence from the subset of sequences based on a mapping between the subset of sequences and the set of bits. The operations of 1620 may be performed according to the methods described herein. In some examples, aspects of the operations of 1620 may be performed by a sequence selection manager as described with reference to FIGS. 7 through 10.

At 1625, the UE may transmit the payload including the set of bits using the selected sequence. The operations of 1625 may be performed according to the methods described herein. In some examples, aspects of the operations of 1625 may be performed by a payload manager as described with reference to FIGS. 7 through 10.

Figure 17:
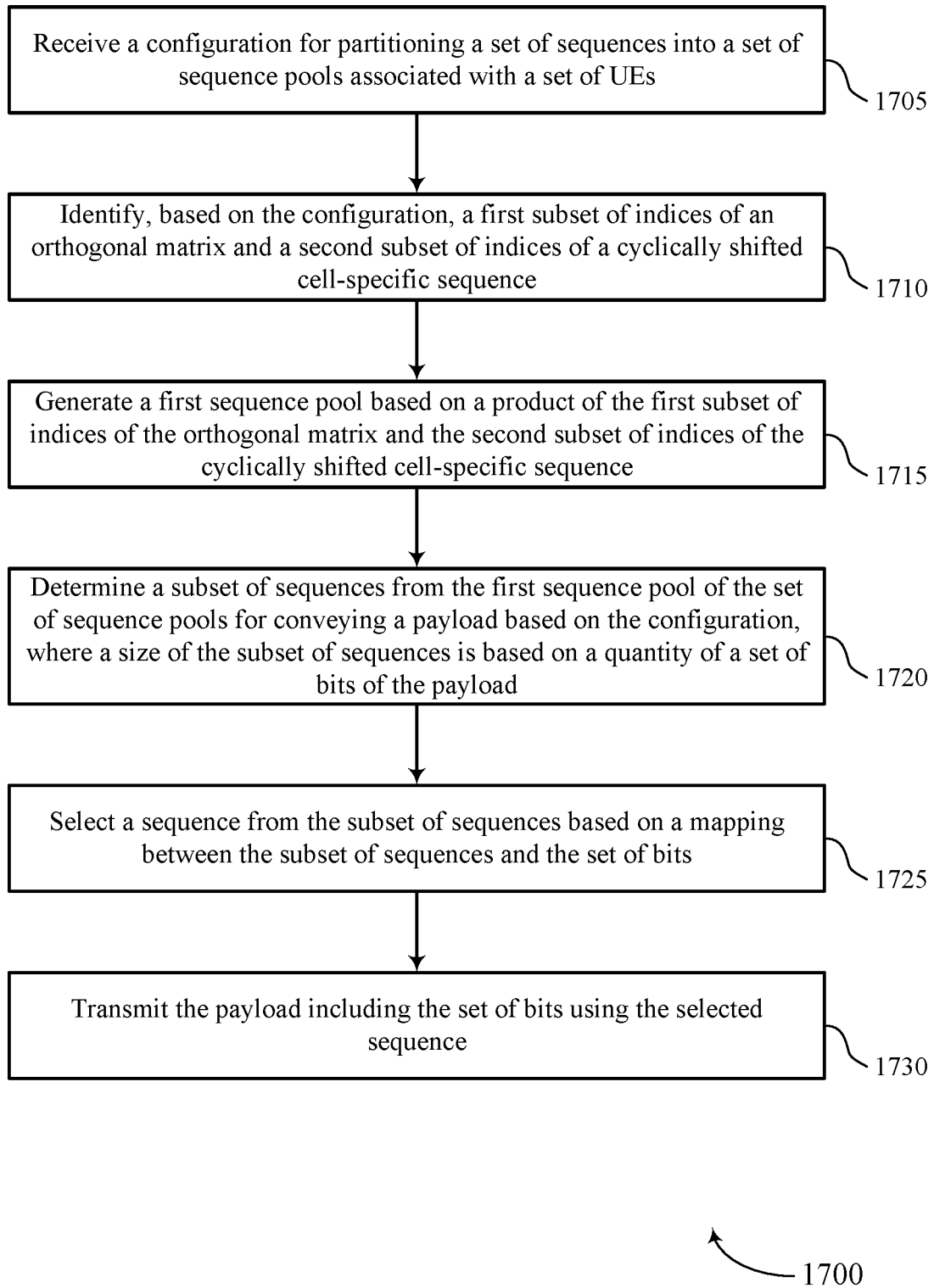

FIG. 17 illustrates a flowchart illustrating a method 1700 that supports sequence partitioning for a multi-user uplink channel in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive a configuration for partitioning a set of sequences into a set of sequence pools associated with a set of UEs. The operations of 1705 may be performed according to the methods described herein. In some examples, aspects of the operations of 1705 may be performed by a partitioning manager as described with reference to FIGS. 7 through 10.

At 1710, the UE may identify, based on the configuration, a first subset of indices of an orthogonal matrix and a second subset of indices of a cyclically shifted cell-specific sequence. The operations of 1710 may be performed according to the methods described herein. In some examples, aspects of the operations of 1710 may be performed by a partitioning manager as described with reference to FIGS. 7 through 10.

At 1715, the UE may generate a first sequence pool based on a product of the first subset of indices of the orthogonal matrix and the second subset of indices of the cyclically shifted cell-specific sequence. The operations of 1715 may be performed according to the methods described herein. In some examples, aspects of the operations of 1715 may be performed by a sequence pool manager as described with reference to FIGS. 7 through 10.

At 1720, the UE may determine a subset of sequences from the first sequence pool of the set of sequence pools for conveying a payload based on the configuration, where a size of the subset of sequences is based on a quantity of a set of bits of the payload. The operations of 1720 may be performed according to the methods described herein. In some examples, aspects of the operations of 1720 may be performed by a codebook manager as described with reference to FIGS. 7 through 10.

At 1725, the UE may select a sequence from the subset of sequences based on a mapping between the subset of sequences and the set of bits. The operations of 1725 may be performed according to the methods described herein. In some examples, aspects of the operations of 1725 may be performed by a sequence selection manager as described with reference to FIGS. 7 through 10.

At 1730, the UE may transmit the payload including the set of bits using the selected sequence. The operations of 1730 may be performed according to the methods described herein. In some examples, aspects of the operations of 1730 may be performed by a payload manager as described with reference to FIGS. 7 through 10.

Figure 18:
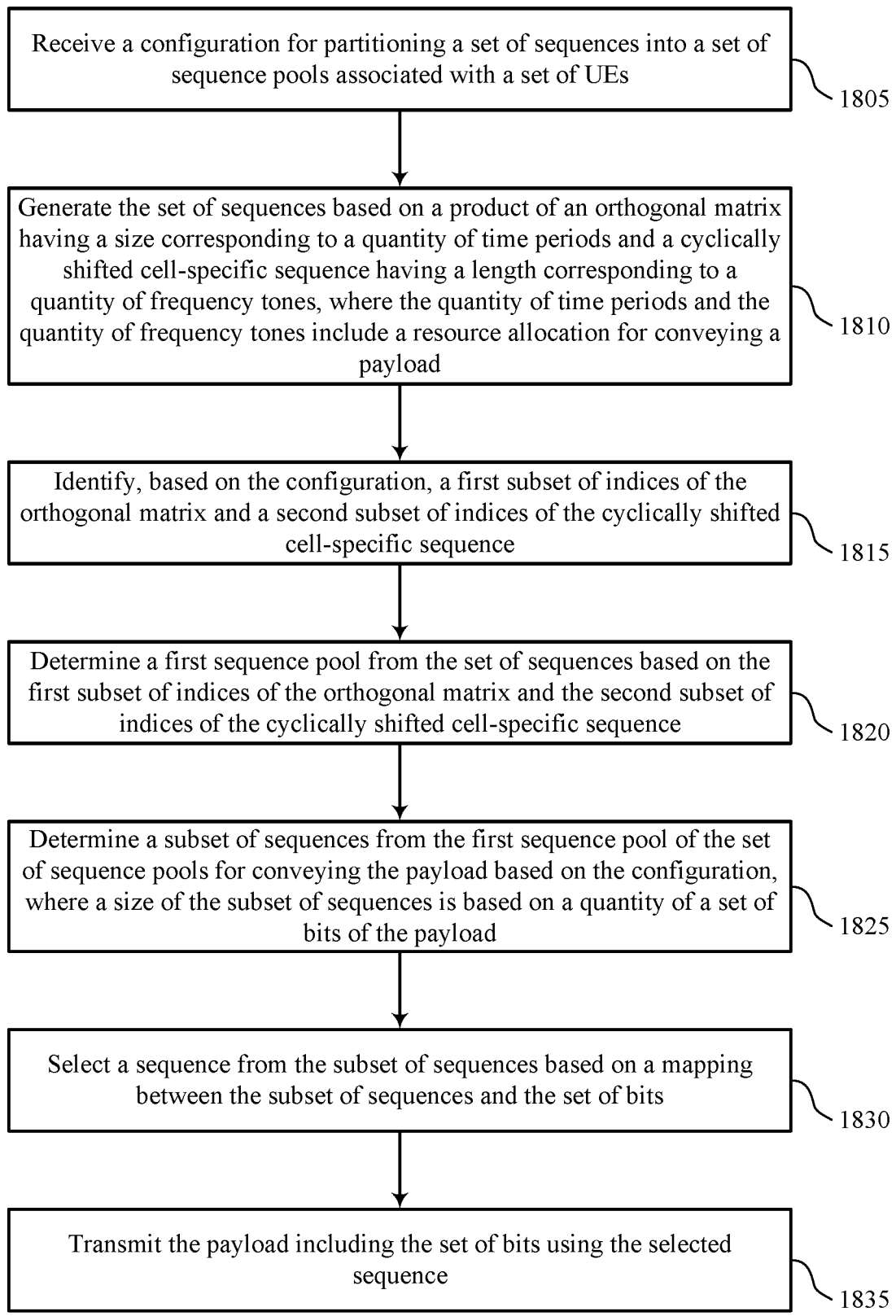

FIG. 18 illustrates a flowchart illustrating a method 1800 that supports sequence partitioning for a multi-user uplink channel in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may receive a configuration for partitioning a set of sequences into a set of sequence pools associated with a set of UEs. The operations of 1805 may be performed according to the methods described herein. In some examples, aspects of the operations of 1805 may be performed by a partitioning manager as described with reference to FIGS. 7 through 10.

At 1810, the UE may generate the set of sequences based on a product of an orthogonal matrix having a size corresponding to a quantity of time periods and a cyclically shifted cell-specific sequence having a length corresponding to a quantity of frequency tones, where the quantity of time periods and the quantity of frequency tones include a resource allocation for conveying a payload. The operations of 1810 may be performed according to the methods described herein. In some examples, aspects of the operations of 1810 may be performed by a sequence generation manager as described with reference to FIGS. 7 through 10.

At 1815, the UE may identify, based on the configuration, a first subset of indices of the orthogonal matrix and a second subset of indices of the cyclically shifted cell-specific sequence. The operations of 1815 may be performed according to the methods described herein. In some examples, aspects of the operations of 1815 may be performed by a partitioning manager as described with reference to FIGS. 7 through 10.

At 1820, the UE may determine a first sequence pool from the set of sequences based on the first subset of indices of the orthogonal matrix and the second subset of indices of the cyclically shifted cell-specific sequence. The operations of 1820 may be performed according to the methods described herein. In some examples, aspects of the operations of 1820 may be performed by a sequence pool manager as described with reference to FIGS. 7 through 10.

At 1825, the UE may determine a subset of sequences from the first sequence pool of the set of sequence pools for conveying the payload based on the configuration, where a size of the subset of sequences is based on a quantity of a set of bits of the payload. The operations of 1825 may be performed according to the methods described herein. In some examples, aspects of the operations of 1825 may be performed by a codebook manager as described with reference to FIGS. 7 through 10.

At 1830, the UE may select a sequence from the subset of sequences based on a mapping between the subset of sequences and the set of bits. The operations of 1830 may be performed according to the methods described herein. In some examples, aspects of the operations of 1830 may be performed by a sequence selection manager as described with reference to FIGS. 7 through 10.

At 1835, the UE may transmit the payload including the set of bits using the selected sequence. The operations of 1835 may be performed according to the methods described herein. In some examples, aspects of the operations of 1835 may be performed by a payload manager as described with reference to FIGS. 7 through 10.

Figure 19:
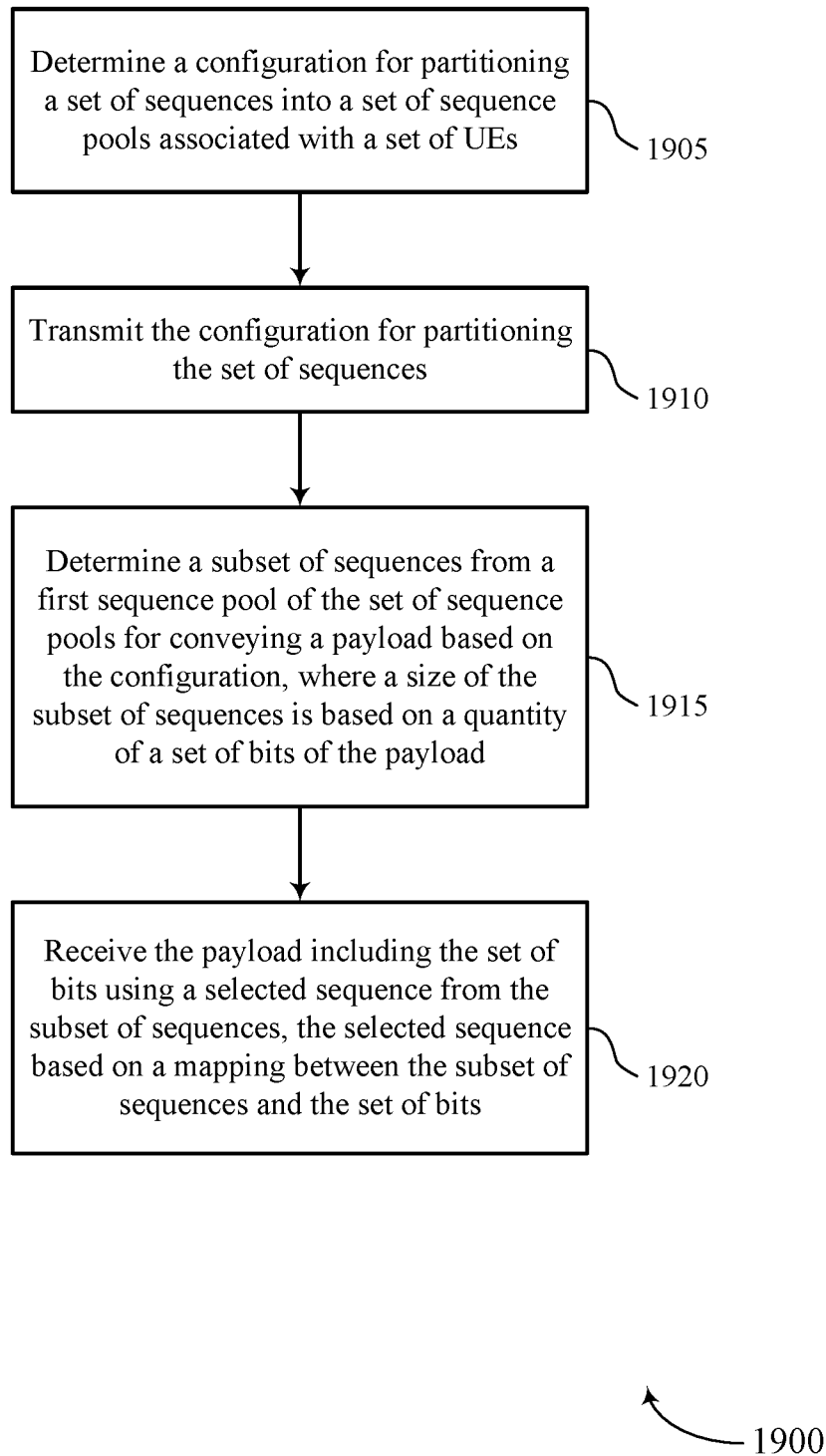

FIG. 19 illustrates a flowchart illustrating a method 1900 that supports sequence partitioning for a multi-user uplink channel in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may determine a configuration for partitioning a set of sequences into a set of sequence pools associated with a set of UEs. The operations of 1905 may be performed according to the methods described herein. In some examples, aspects of the operations of 1905 may be performed by a partitioning manager as described with reference to FIGS. 11 through 14.

At 1910, the base station may transmit the configuration for partitioning the set of sequences. The operations of 1910 may be performed according to the methods described herein. In some examples, aspects of the operations of 1910 may be performed by a partitioning manager as described with reference to FIGS. 11 through 14.

At 1915, the base station may determine a subset of sequences from a first sequence pool of the set of sequence pools for conveying a payload based on the configuration, where a size of the subset of sequences is based on a quantity of a set of bits of the payload. The operations of 1915 may be performed according to the methods described herein. In some examples, aspects of the operations of 1915 may be performed by a codebook manager as described with reference to FIGS. 11 through 14.

At 1920, the base station may receive the payload including the set of bits using a selected sequence from the subset of sequences, the selected sequence based on a mapping between the subset of sequences and the set of bits. The operations of 1920 may be performed according to the methods described herein. In some examples, aspects of the operations of 1920 may be performed by a payload manager as described with reference to FIGS. 11 through 14.

Figure 20:
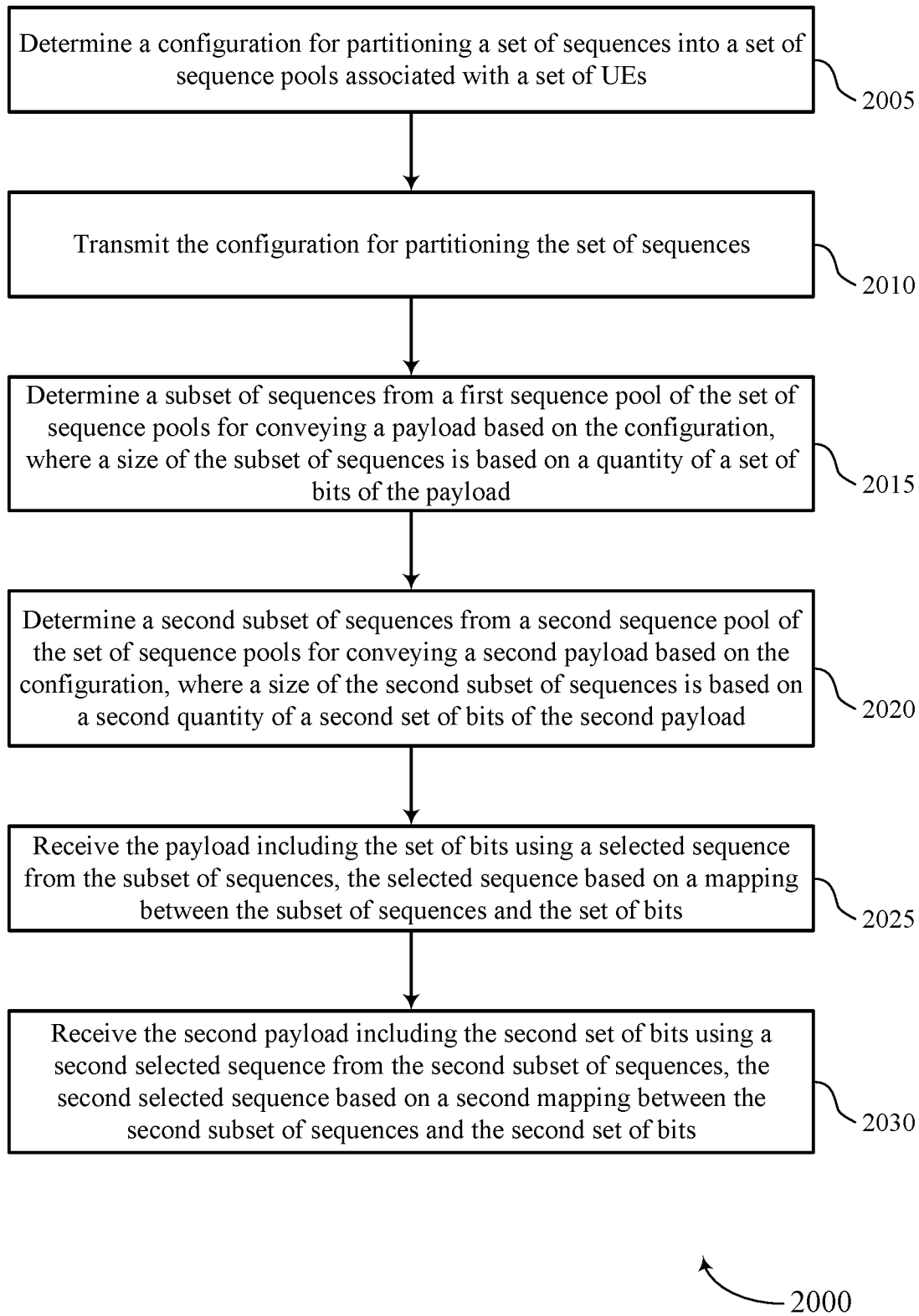

FIG. 20 illustrates a flowchart illustrating a method 2000 that supports sequence partitioning for a multi-user uplink channel in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may determine a configuration for partitioning a set of sequences into a set of sequence pools associated with a set of UEs. The operations of 2005 may be performed according to the methods described herein. In some examples, aspects of the operations of 2005 may be performed by a partitioning manager as described with reference to FIGS. 11 through 14.

At 2010, the base station may transmit the configuration for partitioning the set of sequences. The operations of 2010 may be performed according to the methods described herein. In some examples, aspects of the operations of 2010 may be performed by a partitioning manager as described with reference to FIGS. 11 through 14.

At 2015, the base station may determine a subset of sequences from a first sequence pool of the set of sequence pools for conveying a payload based on the configuration, where a size of the subset of sequences is based on a quantity of a set of bits of the payload. The operations of 2015 may be performed according to the methods described herein. In some examples, aspects of the operations of 2015 may be performed by a codebook manager as described with reference to FIGS. 11 through 14.

At 2020, the base station may determine a second subset of sequences from a second sequence pool of the set of sequence pools for conveying a second payload based on the configuration, where a size of the second subset of sequences is based on a second quantity of a second set of bits of the second payload. The operations of 2020 may be performed according to the methods described herein. In some examples, aspects of the operations of 2020 may be performed by a codebook manager as described with reference to FIGS. 11 through 14.

At 2025, the base station may receive the payload including the set of bits using a selected sequence from the subset of sequences, the selected sequence based on a mapping between the subset of sequences and the set of bits. The operations of 2025 may be performed according to the methods described herein. In some examples, aspects of the operations of 2025 may be performed by a payload manager as described with reference to FIGS. 11 through 14.

At 2030, the base station may receive the second payload including the second set of bits using a second selected sequence from the second subset of sequences, the second selected sequence based on a second mapping between the second subset of sequences and the second set of bits. The operations of 2030 may be performed according to the methods described herein. In some examples, aspects of the operations of 2030 may be performed by a payload manager as described with reference to FIGS. 11 through 14.

The following provides an overview of aspects of the present disclosure:

Aspect 1: A method for wireless communications at a UE, comprising: receiving a configuration for partitioning a plurality of sequences into a plurality of sequence pools associated with a plurality of UEs; determining a subset of sequences from a first sequence pool of the plurality of sequence pools for conveying a payload based at least in part on the configuration, wherein a size of the subset of sequences is based at least in part on a quantity of a plurality of bits of the payload; selecting a sequence from the subset of sequences based at least in part on a mapping between the subset of sequences and the plurality of bits; and transmitting the payload comprising the plurality of bits using the selected sequence.

Aspect 2: The method of aspect 1, further comprising: determining the first sequence pool based at least in part on the configuration, wherein the first sequence pool is associated with the UE.

Aspect 3: The method of aspect 2, wherein the determining the first sequence pool comprises: determining a pool of continuous sequences of the plurality of sequences.

Aspect 4: The method of aspect 2, further comprising: receiving an interleaving value, wherein the determining of the first sequence pool is based at least in part on the interleaving value.

Aspect 5: The method of aspect 4, wherein the determining of the first sequence pool comprises: determining a first quantity of sequences corresponding to the interleaving value; and determining a second quantity of sequences corresponding to the interleaving value a distance from the first quantity of sequences based at least in part on a quantity of the plurality of UEs and the interleaving value.

Aspect 6: The method of any of aspects 1 through 5, further comprising: determining an initial seed based at least in part on a UE identifier, a slot identifier, a frame identifier, or any combination thereof; and generating the first sequence pool based at least in part on the initial seed.

Aspect 7: The method of aspect 6, further comprising: receiving an indication of the UE identifier.

Aspect 8: The method of any of aspects 6 or 7, wherein the first sequence pool is generated based at least in part on a pseudo-random random number generator.

Aspect 9: The method of any of aspects 6 through 8, wherein the first sequence pool is generated based at least in part on a maximum length sequence.

Aspect 10: The method of any of aspects 6 through 9, wherein the first sequence pool is generated based at least in part on a Gold sequence.

Aspect 11: The method of any of aspects 1 through 5, further comprising: identifying, based at least in part on the configuration, a first subset of indices of an orthogonal matrix and a second subset of indices of a cyclically shifted cell-specific sequence; and generating the first sequence pool based at least in part on a product of the first subset of indices of the orthogonal matrix and the second subset of indices of the cyclically shifted cell-specific sequence.

Aspect 12: The method of aspect 11, wherein the first subset of indices of the orthogonal matrix and the second subset of indices of the cyclically shifted cell-specific sequence comprise continuous indices, interleaved indices, or any combination thereof.

Aspect 13: The method of any of aspects 11 through 12, wherein the orthogonal matrix is a DFT matrix.

Aspect 14: The method of any of aspects 1 through 5, further comprising: generating the plurality of sequences based at least in part on a product of an orthogonal matrix having a size corresponding to a quantity of time periods and a cyclically shifted cell-specific sequence having a length corresponding to a quantity of frequency tones, wherein the quantity of time periods and the quantity of frequency tones comprise a resource allocation for conveying the payload; identifying, based at least in part on the configuration, a first subset of indices of the orthogonal matrix and a second subset of indices of the cyclically shifted cell-specific sequence; and determining the first sequence pool from the plurality of sequences based at least in part on the first subset of indices of the orthogonal matrix and the second subset of indices of the cyclically shifted cell-specific sequence.

Aspect 15: The method of aspect 14, wherein the first subset of indices of the orthogonal matrix and the second subset of indices of the cyclically shifted cell-specific sequence comprise continuous indices, interleaved indices, or any combination thereof.

Aspect 16: The method of any of aspects 14 or 15, wherein the orthogonal matrix is a DFT matrix.

Aspect 17: The method of any of aspects 1 through 16, further comprising: converting the plurality of bits into a decimal number, wherein the mapping between the subset of sequences and the plurality of bits is based at least in part on a mapping between the decimal number and an index of the subset of sequences.

Aspect 18: The method of any of aspects 1 through 17, wherein the subset of sequences comprises a codebook for conveying the payload comprising the plurality of bits.

Aspect 19: The method of any of aspects 1 through 18, wherein each sequence of the plurality of sequences is a sequence of numbers.

Aspect 20: A method for wireless communications at a base station, comprising: determining a configuration for partitioning a plurality of sequences into a plurality of sequence pools associated with a plurality of UEs; transmitting the configuration for partitioning the plurality of sequences; determining a subset of sequences from a first sequence pool of the plurality of sequence pools for conveying a payload based at least in part on the configuration, wherein a size of the subset of sequences is based at least in part on a quantity of a plurality of bits of the payload; and receiving the payload comprising the plurality of bits using a selected sequence from the subset of sequences, the selected sequence based at least in part on a mapping between the subset of sequences and the plurality of bits.

Aspect 21: The method of aspect 20, further comprising: determining a second subset of sequences from a second sequence pool of the plurality of sequence pools for conveying a second payload based at least in part on the configuration, wherein a size of the second subset of sequences is based at least in part on a second quantity of a second plurality of bits of the second payload; and receiving the second payload comprising the second plurality of bits using a second selected sequence from the second subset of sequences, the second selected sequence based at least in part on a second mapping between the second subset of sequences and the second plurality of bits.

Aspect 22: The method of any of aspects 20 or 21, further comprising: determining the first sequence pool based at least in part on the configuration, wherein the first sequence pool is associated with a first UE.

Aspect 23: The method of aspect 22, wherein the determining of the first sequence pool comprises: determining a pool of continuous sequences of the plurality of sequences.

Aspect 24: The method of aspect 22, further comprising: determining an interleaving value, wherein determining the first sequence pool is based at least in part on the interleaving value; and transmitting the interleaving value.

Aspect 25: The method of aspect 24, wherein the determining of the first sequence pool comprises: determining a first quantity of sequences corresponding to the interleaving value; and determining a second quantity of sequences corresponding to the interleaving value a distance from the first quantity of sequences based at least in part on a quantity of the plurality of UEs and the interleaving value.

Aspect 26: The method of any of aspects 20 through 25, further comprising: determining an initial seed based at least in part on a UE identifier, a slot identifier, a frame identifier, or any combination thereof and generating the first sequence pool based at least in part on the initial seed.

Aspect 27: The method of aspect 26, further comprising: transmitting an indication of the UE identifier.

Aspect 28: The method of any of aspects 26 or 27, wherein the first sequence pool is generated based at least in part on a pseudo-random random number generator.

Aspect 29: The method of any of aspects 26 through 28, wherein the first sequence pool is generated based at least in part on a maximum length sequence.

Aspect 30: The method of any of aspects 26 through 29, wherein the first sequence pool is generated based at least in part on a Gold sequence.

Aspect 31: The method of any of aspects 20 through 25, further comprising: identifying, based at least in part on the configuration, a first subset of indices of an orthogonal matrix and a second subset of indices of a cyclically shifted cell-specific sequence; and generating the first sequence pool based at least in part on a product of the first subset of indices of the orthogonal matrix and the second subset of indices of the cyclically shifted cell-specific sequence.

Aspect 32: The method of aspect 31, wherein the first subset of indices of the orthogonal matrix and the second subset of indices of the cyclically shifted cell-specific sequence comprise continuous indices, interleaved indices, or any combination thereof.

Aspect 33: The method of any of aspects 31 or 32, wherein the orthogonal matrix is a DFT matrix.

Aspect 34: The method of any of aspects 20 through 25, further comprising: generating the plurality of sequences based at least in part on a product of an orthogonal matrix having a size corresponding to a quantity of time periods and a cyclically shifted cell-specific sequence having a length corresponding to a quantity of frequency tones, wherein the quantity of time periods and the quantity of frequency tones comprise a resource allocation for conveying the payload; identifying, based at least in part on the configuration, a first subset of indices of the orthogonal matrix and a second subset of indices of the cyclically shifted cell-specific sequence; and determining the first sequence pool from the plurality of sequences based at least in part on the first subset of indices of the orthogonal matrix and the second subset of indices of the cyclically shifted cell-specific sequence.

Aspect 35: The method of aspect 34, wherein the first subset of indices of the orthogonal matrix and the second subset of indices of the cyclically shifted cell-specific sequence comprise continuous indices, interleaved indices, or any combination thereof.

Aspect 36: The method of any of aspects 34 or 35, wherein the orthogonal matrix is a DFT matrix.

Aspect 37: The method of any of aspects 20 through 36, wherein the subset of sequences comprises a codebook for conveying the payload comprising the plurality of bits.

Aspect 38: The method of any of aspects 20 through 37, wherein each sequence of the plurality of sequences is a sequence of numbers.

Aspect 39: An apparatus for wireless communications at a UE, comprising a processor; memory coupled with the processor; and instructions stored in the memory and operable, when executed by the processor, to cause the apparatus to perform a method of any of aspects 1 through 19.

Aspect 40: An apparatus for wireless communications at a UE, comprising at least one means for performing a method of any of aspects 1 through 19.

Aspect 41: A non-transitory computer-readable medium storing code for wireless communications at a UE, the code comprising instructions executable by a processor to perform a method of any of aspects 1 through 19.

Aspect 42: An apparatus for wireless communications at a base station, comprising a processor; memory coupled with the processor; and instructions stored in the memory and operable, when executed by the processor, to cause the apparatus to perform a method of any of aspects 20 through 38.

Aspect 43: An apparatus for wireless communications at a base station, comprising at least one means for performing a method of any of aspects 20 through 38.

Aspect 44: A non-transitory computer-readable medium storing code for wireless communications at a base station, the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a configuration for partitioning a plurality of sequences into a plurality of sequence pools associated with a plurality of UEs, the configuration comprising an interleaving value;
   determining an initial seed, wherein each sequence pool of the plurality of sequence pools are aligned with each other based at least in part on the initial seed;
   determining a subset of sequences from a first sequence pool of the plurality of sequence pools for conveying a payload based at least in part on the configuration and the interleaving value, wherein a size of the subset of sequences is based at least in part on a quantity of a plurality of bits of the payload, and wherein the subset of sequences comprises a codebook for conveying the payload comprising the plurality of bits, a size of the codebook based at least in part on the size of the subset of sequences;
   selecting a sequence from the codebook based at least in part on a mapping between the codebook and the plurality of bits; and
   transmitting the payload comprising the plurality of bits using the selected sequence.

2. The method of claim 1, further comprising:
   determining the first sequence pool based at least in part on the configuration, wherein the first sequence pool is associated with the UE.

3. The method of claim 2, wherein the determining of the first sequence pool comprises:
   determining a pool of continuous sequences of the plurality of sequences.

4. The method of claim 1, wherein the determining of the first sequence pool comprises:
   determining a first quantity of sequences corresponding to the interleaving value; and
   determining a second quantity of sequences corresponding to the interleaving value a distance from the first quantity of sequences based at least in part on a quantity of the plurality of UEs and the interleaving value.

5. The method of claim 1,
   wherein the initial seed is based at least in part on a UE identifier, a slot identifier, a frame identifier, or any combination thereof; and further comprising:
   generating the first sequence pool based at least in part on the initial seed.

6. The method of claim 5, further comprising:
   receiving an indication of the UE identifier.

7. The method of claim 5, wherein the first sequence pool is generated based at least in part on a pseudo-random random number generator.

8. The method of claim 5, wherein the first sequence pool is generated based at least in part on a maximum length sequence.

9. The method of claim 1, further comprising:
   identifying, based at least in part on the configuration, a first subset of indices of an orthogonal matrix and a second subset of indices of a cyclically shifted cell-specific sequence; and
   generating the first sequence pool based at least in part on a product of the first subset of indices of the orthogonal matrix and the second subset of indices of the cyclically shifted cell-specific sequence.

10. The method of claim 9, wherein the first subset of indices of the orthogonal matrix and the second subset of indices of the cyclically shifted cell-specific sequence comprise continuous indices, interleaved indices, or any combination thereof.

11. The method of claim 1, further comprising:
    generating the plurality of sequences based at least in part on a product of an orthogonal matrix having a size corresponding to a quantity of time periods and a cyclically shifted cell-specific sequence having a length corresponding to a quantity of frequency tones, wherein the quantity of time periods and the quantity of frequency tones comprise a resource allocation for conveying the payload;
    identifying, based at least in part on the configuration, a first subset of indices of the orthogonal matrix and a second subset of indices of the cyclically shifted cell-specific sequence; and
    determining the first sequence pool from the plurality of sequences based at least in part on the first subset of indices of the orthogonal matrix and the second subset of indices of the cyclically shifted cell-specific sequence.

12. The method of claim 11, wherein the first subset of indices of the orthogonal matrix and the second subset of indices of the cyclically shifted cell-specific sequence comprise continuous indices, interleaved indices, or any combination thereof.

13. The method of claim 1, further comprising:
    converting the plurality of bits into a decimal number, wherein the mapping between the codebook and the plurality of bits is based at least in part on a mapping between the decimal number and an index of the subset of sequences.

14. A method for wireless communications at a network entity, comprising:
   determining a configuration for partitioning a plurality of sequences into a plurality of sequence pools associated with a plurality of user equipments (UEs), the configuration comprising an interleaving value;
   determining an initial seed based at least in part on a UE identifier, a slot identifier, a frame identifier, or any combination thereof, wherein each sequence pool of the plurality of sequence pools are aligned with each other based at least in part on the initial seed;
   transmitting the configuration for partitioning the plurality of sequences;
   determining a subset of sequences from a first sequence pool of the plurality of sequence pools for conveying a payload based at least in part on the configuration and the interleaving value, wherein a size of the subset of sequences is based at least in part on a quantity of a plurality of bits of the payload, and wherein the subset of sequences comprises a codebook for conveying the payload comprising the plurality of bits, a size of the codebook based at least in part on the size of the subset of sequences; and
   receiving the payload comprising the plurality of bits using a selected sequence from the codebook, the selected sequence based at least in part on a mapping between the codebook and the plurality of bits.

15. The method of claim 14, further comprising:
   determining a second subset of sequences from a second sequence pool of the plurality of sequence pools for conveying a second payload based at least in part on the configuration, wherein a size of the second subset of sequences is based at least in part on a second quantity of a second plurality of bits of the second payload; and
   receiving the second payload comprising the second plurality of bits using a second selected sequence from the second subset of sequences, the second selected sequence based at least in part on a second mapping between the second subset of sequences and the second plurality of bits.

16. The method of claim 14, further comprising:
   determining the first sequence pool based at least in part on the configuration, wherein the first sequence pool is associated with a first UE.

17. The method of claim 16, wherein the determining of the first sequence pool comprises:
   determining a pool of continuous sequences of the plurality of sequences.

18. The method of claim 14, wherein the determining of the first sequence pool comprises:
   determining a first quantity of sequences corresponding to the interleaving value; and
   determining a second quantity of sequences corresponding to the interleaving value a distance from the first quantity of sequences based at least in part on a quantity of the plurality of UEs and the interleaving value.

19. An apparatus for wireless communications at a user equipment (UE), comprising:
   one or more processors,
   memory coupled with the one or more processors; and
   instructions stored in the memory and operable, when executed by the one or more processors, to cause the apparatus to:
      receive a configuration for partitioning a plurality of sequences into a plurality of sequence pools associated with a plurality of UEs, the configuration comprising an interleaving value;
      determine an initial seed based at least in part on a UE identifier, a slot identifier, a frame identifier, or any combination thereof, wherein each sequence pool of the plurality of sequence pools are aligned with each other based at least in part on the initial seed;
      determine a subset of sequences from a first sequence pool of the plurality of sequence pools for conveying a payload based at least in part on the configuration and the interleaving value, wherein a size of the subset of sequences is based at least in part on a quantity of a plurality of bits of the payload, and wherein the subset of sequences comprises a codebook for conveying the payload comprising the plurality of bits, a size of the codebook based at least in part on the size of the subset of sequences;
      select a sequence from the codebook based at least in part on a mapping between the codebook and the plurality of bits; and
      transmit the payload comprising the plurality of bits using the selected sequence.

20. The apparatus of claim 19, wherein the instructions are further operable, when executed by the one or more processors, to cause the apparatus to:
   determine the first sequence pool based at least in part on the configuration, wherein the first sequence pool is associated with the UE.

21. The apparatus of claim 20, wherein the instructions to determine the first sequence pool are operable, when executed by the one or more processors, to cause the apparatus to:
   determine a pool of continuous sequences of the plurality of sequences.

22. The apparatus of claim 19, wherein the instructions to determine the first sequence pool are operable, when executed by the one or more processors, to cause the apparatus to:
   determine a first quantity of sequences corresponding to the interleaving value; and
   determine a second quantity of sequences corresponding to the interleaving value a distance from the first quantity of sequences based at least in part on a quantity of the plurality of UEs and the interleaving value.

23. The apparatus of claim 19, wherein
   the initial seed is based at least in part on a UE identifier, a slot identifier, a frame identifier, or any combination thereof; and wherein the instructions are further operable, when executed by the one or more processors, to cause the apparatus to:
   generate the first sequence pool based at least in part on the initial seed.

24. The apparatus of claim 19, wherein the instructions are further operable, when executed by the one or more processors, to cause the apparatus to:
   identify, based at least in part on the configuration, a first subset of indices of an orthogonal matrix and a second subset of indices of a cyclically shifted cell-specific sequence; and
   generate the first sequence pool based at least in part on a product of the first subset of indices of the orthogonal matrix and the second subset of indices of the cyclically shifted cell-specific sequence.

25. The apparatus of claim 19, wherein the instructions are further operable, when executed by the one or more processors, to cause the apparatus to:
- generate the plurality of sequences based at least in part on a product of an orthogonal matrix having a size corresponding to a quantity of time periods and a cyclically shifted cell-specific sequence having a length corresponding to a quantity of frequency tones, wherein the quantity of time periods and the quantity of frequency tones comprise a resource allocation for conveying the payload;
- identify, based at least in part on the configuration, a first subset of indices of the orthogonal matrix and a second subset of indices of the cyclically shifted cell-specific sequence; and
- determine the first sequence pool from the plurality of sequences based at least in part on the first subset of indices of the orthogonal matrix and the second subset of indices of the cyclically shifted cell-specific sequence.

26. An apparatus for wireless communications at a network entity, comprising:
- one or more processors,
- memory coupled with the one or more processors; and
- instructions stored in the memory and operable, when executed by the one or more processors, to cause the apparatus to:
  - determine a configuration for partitioning a plurality of sequences into a plurality of sequence pools associated with a plurality of user equipments (UEs), the configuration comprising an interleaving value;
  - determine an initial seed based at least in part on a UE identifier, a slot identifier, a frame identifier, or any combination thereof, wherein each sequence pool of the plurality of sequence pools are aligned with each other based at least in part on the initial seed;
  - transmit the configuration for partitioning the plurality of sequences;
  - determine a subset of sequences from a first sequence pool of the plurality of sequence pools for conveying a payload based at least in part on the configuration and the interleaving value, wherein a size of the subset of sequences is based at least in part on a quantity of a plurality of bits of the payload, and wherein the subset of sequences comprises a codebook for conveying the payload comprising the plurality of bits, a size of the codebook based at least in part on the size of the subset of sequences; and
  - receive the payload comprising the plurality of bits using a selected sequence from the codebook, the selected sequence based at least in part on a mapping between the codebook and the plurality of bits.

27. The method of claim 1, wherein the mapping comprises a mapping between an index of the codebook and the plurality of bits and the plurality of bits comprises a bit stream of the payload.

* * * * *